United States Patent
Berry et al.

(10) Patent No.: US 8,216,624 B2
(45) Date of Patent: *Jul. 10, 2012

(54) AERATED FOOD PRODUCTS

(75) Inventors: Mark John Berry, Shambrook (GB);
Deryck Jozef Cebula, Shambrook (GB);
Andrew Richard Cox, Shambrook
(GB); Matthew Duncan Golding,
Vlaardingen (NL); Robert Daniel
Keenan, Shambrook (GB); Mark
Emmett Malone, Palmerston North
(NZ); Sarah Twigg, Shambrook (GB)

(73) Assignee: Conopco, Inc., Englewood Cliffs, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/168,209

(22) Filed: Jun. 27, 2005

(65) Prior Publication Data

US 2006/0024417 A1    Feb. 2, 2006

(30) Foreign Application Priority Data

Jul. 27, 2004  (EP) .................................. 04254483
Mar. 3, 2005   (EP) .................................. 05251282

(51) Int. Cl.
    *A23G 9/00*     (2006.01)
    *A23L 1/48*     (2006.01)
(52) U.S. Cl. .................. 426/564; 426/565; 426/660
(58) Field of Classification Search ................ 426/565,
                                    426/103, 330.4, 564, 660, 650
    See application file for complete search history.

(56) References Cited

U.S. PATENT DOCUMENTS

| 4,627,983 | A | 12/1986 | Scharf et al. | |
| 4,874,627 | A * | 10/1989 | Greig et al. | 426/565 |
| 5,215,777 | A | 6/1993 | Asher et al. | |
| 6,096,867 | A | 8/2000 | Byass et al. | |
| 2001/0048962 | A1* | 12/2001 | Fenn et al. | 426/565 |
| 2002/0197375 | A1* | 12/2002 | Adolphi et al. | 426/565 |
| 2003/0148400 | A1 | 8/2003 | Haikara et al. | 435/7.5 |
| 2004/0185162 | A1* | 9/2004 | Finnigan et al. | 426/615 |

FOREIGN PATENT DOCUMENTS

| DE | 297 15 519 | 11/1997 |
| EP | 1 327 390 | 7/2003 |
| JP | S52-102444 | 8/1977 |
| JP | S53-6491 | 1/1978 |
| JP | S58-81740 | 5/1983 |
| JP | 2003-507056 | 2/2003 |
| JP | 2007-522939 | 2/2006 |
| WO | 96/41882 | 12/1996 |
| WO | WO 96/41882 | 12/1996 |
| WO | 99/54725 | 10/1999 |
| WO | 00/58342 | 10/2000 |
| WO | WO 01/14521 | 3/2001 |

(Continued)

OTHER PUBLICATIONS

Fennema's Food Chemistry 4th Edition CRC Press 2008 pp. 727 and 728.*

(Continued)

*Primary Examiner* — Kelly Bekker
(74) *Attorney, Agent, or Firm* — Morgan, Lewis & Bockius LLP

(57) ABSTRACT

An aerated food product is provided which includes hydrophobin. Also provided is the use of a hydrophobin in a method of inhibiting bubble coarsening in aerated food products.

5 Claims, 7 Drawing Sheets

FOREIGN PATENT DOCUMENTS

| WO | 01/57076 | 8/2001 |
|---|---|---|
| WO | 01/74864 | 10/2001 |
| WO | 03/015530 | 2/2003 |
| WO | 03/053383 | 7/2003 |

OTHER PUBLICATIONS

Dictionary.com, Stabilizer, pp. 1-5. print date Jun. 14, 2010.*
Guargum.biz, Guar Gum, pp. 1-2. print date Jun. 14, 2010.*
Database WPI, Section Ch, Week 200444, XP002313777 & KR 2004 018 844 A.
Scholmeijer et al., "Fungal Hydrophobins in Medical and Technical Applications", Applied Microbiology and Biotechnology, Springer Verlag, Berlin, DE, vol. 56, No. ½, pp. 1-8.
de Vocht et al., "Structural Characterization of the Hydrophobin SC3, as a Monomer and after Self-Assembly at Hydrophobic/Hydrophilic Interfaces", Biophys. J. 74: pp. 2059-2068.
Collin et al., "A novel two-step extraction method with detergent/polymer systems for primary recovery of the fusion protein endoglucanase 1-hydrophobin I", 2002, Biochim Biophys Acta. 1569: pp. 139-150.
Calonje et al., Properties of a hydrophobin isolated from the mycoparasitic fungus *Verticillium fungicola*, Can. J. Microbiol. 48: pp. 1030-1034.
Van der Werf, 2000 Leads in Life Sciences Jul. 2000: 5.
Co-pending application for Aldred et al., Case No. F3383(C); U.S. Appl. No. 11/168,214, filed Jun. 27, 2005.
Penttila et al., Molecular Biology of *Trichoderma* and Biotechnological Applications, "Handbook of Fungal Biotechnology" 2nd edition, edited by Dilip et al., vol. 20, pp. 413-427, 2004.
Russo et al., "The surface activity of the phytotoxin cerato-ulmin", 1982 National Research Council of Canada, pp. 1414-1422.
Stringer et al., "Cerato-ulmin, a Toxin Involved in Dutch Elm Disease, Is a Fungal Hydrophobin", The Plant Cell, Feb. 1993, pp. 145-146.
Woesten, "Hydrophobins, the fungal coat unravelled", Biochimica et Biophysica Seta. MR. Reviews on Biomembranes, Elsevier, Amsterdam, NL, vol. 1469, No. 2, Sep. 18, 2000, pp. 79-86.
Wessells J, "Fungal hydrophobins: proteins that function at an interface", Trends in Plant Science, Elsevier Science, Oxford GB, vol. 1, Jan. 1996, pp. 9-15.
Haakanpaa et al., "Atomic Resolution Structure of the HFBII Hydrophobin, a Self-assembling Amphiphile*", The Journal of Biological Chemistry, 2004, The American Society for Biochemistry and Molecular Biology, Inc., vol. 279, No. 1, Issue of Jan. 2, pp. 534-539.
Lindner et al., hydrophobins: the protein-amphiphiles of filamentous fungi, 2005, Elsevier B.V. on behalf of the Federation of European Microbiological Societies, pp. 1-20.
Gliga, Teodora, article available on the Internet of at least May 20, 2007, regarding hydrophobins, with translation, pp. 1-21.
International Search Report on Application No. PCT/EP2005/006997 dated Dec. 13, 2005, pp. 1-4.
International Search Report on Application No. PCT/EP2005/006996 dated Oct. 18, 2005, pp. 1-5.
European Search Report on Application No. EP 04 25 4483 dated Jan. 17, 2005, pp. 1-2.
European Search Report on Application No. EP 05 07 6480 dated Oct. 3, 2005, pp. 1-4.
European Search Report on Application No. EP 05 07 6481 dated Oct. 3, 2005, pp. 1-4.
Database WPI, Section Ch, Week 200444, XP002313777 & KR 2004 018 844 A, p. 1. Mar. 4, 2004.
Scholmeijer et al., "Fungal Hydrophobins in Medical and Technical Applications", Applied Microbiology and Biotechnology, Springer Verlag, Berlin, DE, vol. 56, No. ½, pp. 1-8, May 2001.
Wessels, "Hydrophobins: Proteins that Change the Nature of the Fungal Surface", 1997, Adv. Microb. Physio 38: pp. 1-45.
Wosten, "Hydrophobins: Multipurpose Proteins", 2001, Annu Rev. Microbiol. 55: pp. 625-646.
de Vocht et al., "Structural Characterization of the Hydrophobin SC3, as a Monomer and after Self-Assembly at Hydrophobic/Hydrophilic Interfaces", Biophys. J. 74: pp. 2059-2068, Apr. 1998.
Collin et al., "A novel-two-step extraction method with detergent/polymer systems for primary recovery of the fusion protein endoglucanase I-hydrophobin I", 2002, Biochim Biophys Acta. 1569: pp. 139-150.
Calonje et al., Properties of a hydrophobin isolated from the mycoparasitic fungus *Verticillium fungicola*, Can. J. Microbiol. 48: pp. 1030-1034, 2002.
Askolin et al., "Overproduction, purification, and characterization of the *Trichoderma reesei* hydrophobin HFBI", 2001, Appl. Microbiol Biotechnol. 57: pp. 124-130.
De Vries et al., Identification and characterization of a tri-partite hydrophobin from *Claviceps fusiformis*, 1999, Eur J. Biochem. 262: pp. 377-385.
Kershaw et al., "Hydrophobins and Repellents: Proteins with Fundamental Roles in Fungal Morphogenesis", 1998, Fungal Genetics and Biology 23: pp. 18-33.
Van der Werf, 2000 Leads in Life Sciences Jul. 2000: 5, p. 1.
Talbot, 2001 fungal Hhydrophobins in "The Mycota: A Comprehensive Treatise on Fungi as Experimental Systems for Basic and Applied Research" Howard and Gow (Eds), vol. 7: "Biology of the Fungal Cell" springer-Verlag, Berline and Heidelberg GmbH and Co., pp. 145-159.
Co-pending application for Aldred et al., Case No. F3383(C); U.S. Appl. No. 11/168,214, filed Jun. 27, 2005, p. 1-27.

* cited by examiner

A

B

C

A (1 day at chill temperature)

B (2 weeks at chill temperature)

SEQUENCE LISTING

```
<160> NUMBER OF SEQ ID NOS: 2

<210> SEQ ID NO 1
<211> LENGTH: 4106
<212> TYPE: PRT
<213> ORGANISM: Artificial Sequence
<220> FEATURE:
<223> OTHER INFORMATION: Hydrophobin
<220> FEATURE:
<221> NAME/KEY: MISC_FEATURE
<222> LOCATION: (1)..(2000)
<223> OTHER INFORMATION: Xaa may be any amino acid; One or more Xaa
      may be missing
<220> FEATURE:
<221> NAME/KEY: MISC_FEATURE
<222> LOCATION: (2002)..(2006)
<223> OTHER INFORMATION: Xaa may be any amino acid;
<220> FEATURE:
<221> NAME/KEY: MISC_FEATURE
<222> LOCATION: (2007)..(2010)
<223> OTHER INFORMATION: Xaa may be any amino acid; One or more Xaa
      may be missing
<220> FEATURE:
<221> NAME/KEY: MISC_FEATURE
<222> LOCATION: (2013)..(2023)
<223> OTHER INFORMATION: Xaa may be any amino acid;
<220> FEATURE:
<221> NAME/KEY: MISC_FEATURE
<222> LOCATION: (2024)..(2051)
<223> OTHER INFORMATION: Xaa may be any amino acid; One or more Xaa
      may be missing
<220> FEATURE:
<221> NAME/KEY: MISC_FEATURE
<222> LOCATION: (2053)..(2060)
<223> OTHER INFORMATION: Xaa may be any amino acid;
<220> FEATURE:
<221> NAME/KEY: MISC_FEATURE
<222> LOCATION: (2061)..(2075)
<223> OTHER INFORMATION: Xaa may be any amino acid; One or more Xaa
      may be missing
<220> FEATURE:
<221> NAME/KEY: MISC_FEATURE
<222> LOCATION: (2077)..(2081)
<223> OTHER INFORMATION: Xaa may be any amino acid;
<220> FEATURE:
<221> NAME/KEY: MISC_FEATURE
<222> LOCATION: (2082)..(2085)
<223> OTHER INFORMATION: Xaa may be any amino acid; One or more Xaa
      may be missing
<220> FEATURE:
<221> NAME/KEY: MISC_FEATURE
<222> LOCATION: (2088)..(2093)
<223> OTHER INFORMATION: Xaa may be any amino acid;
<220> FEATURE:
<221> NAME/KEY: MISC_FEATURE
<222> LOCATION: (2094)..(2105)
```

<223> OTHER INFORMATION: Xaa may be any amino acid; One or more Xaa
      may be missing
<220> FEATURE:
<221> NAME/KEY: MISC_FEATURE
<222> LOCATION: (2107)..(4106)
<223> OTHER INFORMATION: Xaa may be any amino acid; One or more Xaa
      may be missing

<400> SEQUENCE: 1

Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa
    50                  55                  60

Xaa Xaa Xaa Xaa Xaa Xaa Xaa Xaa Xaa Xaa Xaa Xaa Xaa Xaa Xaa
65              70                  75                  80

Xaa Xaa Xaa Xaa Xaa Xaa Xaa Xaa Xaa Xaa Xaa Xaa Xaa Xaa Xaa
            85                  90                  95

Xaa Xaa Xaa Xaa Xaa Xaa Xaa Xaa Xaa Xaa Xaa Xaa Xaa Xaa Xaa
        100                 105                 110

Xaa Xaa Xaa Xaa Xaa Xaa Xaa Xaa Xaa Xaa Xaa Xaa Xaa Xaa Xaa
    115                 120                 125

Xaa Xaa Xaa Xaa Xaa Xaa Xaa Xaa Xaa Xaa Xaa Xaa Xaa Xaa Xaa
130                 135                 140

Xaa Xaa Xaa Xaa Xaa Xaa Xaa Xaa Xaa Xaa Xaa Xaa Xaa Xaa Xaa
145                 150                 155                 160

Xaa Xaa Xaa Xaa Xaa Xaa Xaa Xaa Xaa Xaa Xaa Xaa Xaa Xaa Xaa
            165                 170                 175

Xaa Xaa Xaa Xaa Xaa Xaa Xaa Xaa Xaa Xaa Xaa Xaa Xaa Xaa Xaa
        180                 185                 190

Xaa Xaa Xaa Xaa Xaa Xaa Xaa Xaa Xaa Xaa Xaa Xaa Xaa Xaa Xaa
    195                 200                 205

Xaa Xaa Xaa Xaa Xaa Xaa Xaa Xaa Xaa Xaa Xaa Xaa Xaa Xaa Xaa
210                 215                 220

Xaa Xaa Xaa Xaa Xaa Xaa Xaa Xaa Xaa Xaa Xaa Xaa Xaa Xaa Xaa
225                 230                 235                 240

Xaa Xaa Xaa Xaa Xaa Xaa Xaa Xaa Xaa Xaa Xaa Xaa Xaa Xaa Xaa
            245                 250                 255

Xaa Xaa Xaa Xaa Xaa Xaa Xaa Xaa Xaa Xaa Xaa Xaa Xaa Xaa Xaa
        260                 265                 270

Xaa Xaa Xaa Xaa Xaa Xaa Xaa Xaa Xaa Xaa Xaa Xaa Xaa Xaa Xaa
    275                 280                 285

Xaa Xaa Xaa Xaa Xaa Xaa Xaa Xaa Xaa Xaa Xaa Xaa Xaa Xaa Xaa
290                 295                 300

Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa
            325                 330                 335

Xaa Xaa Xaa Xaa Xaa Xaa Xaa Xaa Xaa Xaa Xaa Xaa Xaa Xaa Xaa
        340                 345                 350

Xaa Xaa Xaa Xaa Xaa Xaa Xaa Xaa Xaa Xaa Xaa Xaa Xaa Xaa Xaa
    355                 360                 365

Xaa Xaa Xaa Xaa Xaa Xaa Xaa Xaa Xaa Xaa Xaa Xaa Xaa Xaa Xaa

-continued

```
            370                 375                 380
Xaa Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa Xaa Xaa Xaa Xaa Xaa Xaa
            405                 410                 415

Xaa Xaa Xaa Xaa Xaa Xaa Xaa Xaa Xaa Xaa Xaa Xaa Xaa Xaa Xaa
            420                 425                 430

Xaa Xaa Xaa Xaa Xaa Xaa Xaa Xaa Xaa Xaa Xaa Xaa Xaa Xaa Xaa
            435                 440                 445

Xaa Xaa Xaa Xaa Xaa Xaa Xaa Xaa Xaa Xaa Xaa Xaa Xaa Xaa Xaa
450                 455                 460

Xaa Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa
            485                 490                 495

Xaa Xaa Xaa Xaa Xaa Xaa Xaa Xaa Xaa Xaa Xaa Xaa Xaa Xaa Xaa
            500                 505                 510

Xaa Xaa Xaa Xaa Xaa Xaa Xaa Xaa Xaa Xaa Xaa Xaa Xaa Xaa Xaa
            515                 520                 525

Xaa Xaa Xaa Xaa Xaa Xaa Xaa Xaa Xaa Xaa Xaa Xaa Xaa Xaa Xaa
            530                 535                 540

Xaa Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa
            565                 570                 575

Xaa Xaa Xaa Xaa Xaa Xaa Xaa Xaa Xaa Xaa Xaa Xaa Xaa Xaa Xaa
            580                 585                 590

Xaa Xaa Xaa Xaa Xaa Xaa Xaa Xaa Xaa Xaa Xaa Xaa Xaa Xaa Xaa
            595                 600                 605

Xaa Xaa Xaa Xaa Xaa Xaa Xaa Xaa Xaa Xaa Xaa Xaa Xaa Xaa Xaa
            610                 615                 620

Xaa Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa
            645                 650                 655

Xaa Xaa Xaa Xaa Xaa Xaa Xaa Xaa Xaa Xaa Xaa Xaa Xaa Xaa Xaa
            660                 665                 670

Xaa Xaa Xaa Xaa Xaa Xaa Xaa Xaa Xaa Xaa Xaa Xaa Xaa Xaa Xaa
            675                 680                 685

Xaa Xaa Xaa Xaa Xaa Xaa Xaa Xaa Xaa Xaa Xaa Xaa Xaa Xaa Xaa
            690                 695                 700

Xaa Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa
            725                 730                 735

Xaa Xaa Xaa Xaa Xaa Xaa Xaa Xaa Xaa Xaa Xaa Xaa Xaa Xaa Xaa
            740                 745                 750

Xaa Xaa Xaa Xaa Xaa Xaa Xaa Xaa Xaa Xaa Xaa Xaa Xaa Xaa Xaa
            755                 760                 765

Xaa Xaa Xaa Xaa Xaa Xaa Xaa Xaa Xaa Xaa Xaa Xaa Xaa Xaa Xaa
            770                 775                 780

Xaa Xaa Xaa Xaa Xaa Xaa Xaa Xaa Xaa Xaa Xaa Xaa Xaa Xaa Xaa Xaa
785                 790                 795                 800
```

-continued

Xaa Xaa Xaa Xaa Xaa Xaa Xaa Xaa Xaa Xaa Xaa Xaa Xaa Xaa Xaa
         805                 810                 815

Xaa Xaa Xaa Xaa Xaa Xaa Xaa Xaa Xaa Xaa Xaa Xaa Xaa Xaa Xaa
         820                 825                 830

Xaa Xaa Xaa Xaa Xaa Xaa Xaa Xaa Xaa Xaa Xaa Xaa Xaa Xaa Xaa
         835                 840                 845

Xaa Xaa Xaa Xaa Xaa Xaa Xaa Xaa Xaa Xaa Xaa Xaa Xaa Xaa Xaa
         850                 855                 860

Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa
         885                 890                 895

Xaa Xaa Xaa Xaa Xaa Xaa Xaa Xaa Xaa Xaa Xaa Xaa Xaa Xaa Xaa
         900                 905                 910

Xaa Xaa Xaa Xaa Xaa Xaa Xaa Xaa Xaa Xaa Xaa Xaa Xaa Xaa Xaa
         915                 920                 925

Xaa Xaa Xaa Xaa Xaa Xaa Xaa Xaa Xaa Xaa Xaa Xaa Xaa Xaa Xaa
         930                 935                 940

Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa
         965                 970                 975

Xaa Xaa Xaa Xaa Xaa Xaa Xaa Xaa Xaa Xaa Xaa Xaa Xaa Xaa Xaa
         980                 985                 990

Xaa Xaa Xaa Xaa Xaa Xaa Xaa  Xaa Xaa Xaa Xaa Xaa  Xaa Xaa Xaa
         995                 1000                1005

Xaa Xaa  Xaa Xaa Xaa Xaa Xaa  Xaa Xaa Xaa Xaa Xaa  Xaa Xaa Xaa
  1010                1015                1020

Xaa Xaa  Xaa Xaa Xaa Xaa Xaa  Xaa Xaa Xaa Xaa Xaa  Xaa Xaa Xaa
  1025                1030                1035

Xaa Xaa  Xaa Xaa Xaa Xaa Xaa  Xaa Xaa Xaa Xaa Xaa  Xaa Xaa Xaa
  1040                1045                1050

Xaa Xaa  Xaa Xaa Xaa Xaa Xaa  Xaa Xaa Xaa Xaa Xaa  Xaa Xaa Xaa
  1055                1060                1065

Xaa Xaa  Xaa Xaa Xaa Xaa Xaa  Xaa Xaa Xaa Xaa Xaa  Xaa Xaa Xaa
  1070                1075                1080

Xaa Xaa  Xaa Xaa Xaa Xaa Xaa  Xaa Xaa Xaa Xaa Xaa  Xaa Xaa Xaa
  1085                1090                1095

Xaa Xaa  Xaa Xaa Xaa Xaa Xaa  Xaa Xaa Xaa Xaa Xaa  Xaa Xaa Xaa
  1100                1105                1110

Xaa Xaa  Xaa Xaa Xaa Xaa Xaa  Xaa Xaa Xaa Xaa Xaa  Xaa Xaa Xaa
  1115                1120                1125

Xaa Xaa  Xaa Xaa Xaa Xaa Xaa  Xaa Xaa Xaa Xaa Xaa  Xaa Xaa Xaa
  1130                1135                1140

Xaa Xaa  Xaa Xaa Xaa Xaa Xaa  Xaa Xaa Xaa Xaa Xaa  Xaa Xaa Xaa
  1145                1150                1155

Xaa Xaa  Xaa Xaa Xaa Xaa Xaa  Xaa Xaa Xaa Xaa Xaa  Xaa Xaa Xaa
  1160                1165                1170

Xaa Xaa  Xaa Xaa Xaa Xaa Xaa  Xaa Xaa Xaa Xaa Xaa  Xaa Xaa Xaa
  1175                1180                1185

Xaa Xaa  Xaa Xaa Xaa Xaa Xaa  Xaa Xaa Xaa Xaa Xaa  Xaa Xaa Xaa
  1190                1195                1200

Xaa Xaa  Xaa Xaa Xaa Xaa Xaa  Xaa Xaa Xaa Xaa Xaa  Xaa Xaa Xaa
  1205                1210                1215

-continued

Xaa Xaa Xaa Xaa Xaa Xaa Xaa Xaa Xaa Xaa Xaa Xaa Xaa Xaa Xaa
    1220                1225                1230

Xaa Xaa Xaa Xaa Xaa Xaa Xaa Xaa Xaa Xaa Xaa Xaa Xaa Xaa Xaa
    1235                1240                1245

Xaa Xaa Xaa Xaa Xaa Xaa Xaa Xaa Xaa Xaa Xaa Xaa Xaa Xaa Xaa
    1250                1255                1260

Xaa Xaa Xaa Xaa Xaa Xaa Xaa Xaa Xaa Xaa Xaa Xaa Xaa Xaa Xaa
    1265                1270                1275

Xaa Xaa Xaa Xaa Xaa Xaa Xaa Xaa Xaa Xaa Xaa Xaa Xaa Xaa Xaa
    1280                1285                1290

Xaa Xaa Xaa Xaa Xaa Xaa Xaa Xaa Xaa Xaa Xaa Xaa Xaa Xaa Xaa
    1295                1300                1305

Xaa Xaa Xaa Xaa Xaa Xaa Xaa Xaa Xaa Xaa Xaa Xaa Xaa Xaa Xaa
    1310                1315                1320

Xaa Xaa Xaa Xaa Xaa Xaa Xaa Xaa Xaa Xaa Xaa Xaa Xaa Xaa Xaa
    1325                1330                1335

Xaa Xaa Xaa Xaa Xaa Xaa Xaa Xaa Xaa Xaa Xaa Xaa Xaa Xaa Xaa
    1340                1345                1350

Xaa Xaa Xaa Xaa Xaa Xaa Xaa Xaa Xaa Xaa Xaa Xaa Xaa Xaa Xaa
    1355                1360                1365

Xaa Xaa Xaa Xaa Xaa Xaa Xaa Xaa Xaa Xaa Xaa Xaa Xaa Xaa Xaa
    1370                1375                1380

Xaa Xaa Xaa Xaa Xaa Xaa Xaa Xaa Xaa Xaa Xaa Xaa Xaa Xaa Xaa
    1385                1390                1395

Xaa Xaa Xaa Xaa Xaa Xaa Xaa Xaa Xaa Xaa Xaa Xaa Xaa Xaa Xaa
    1400                1405                1410

Xaa Xaa Xaa Xaa Xaa Xaa Xaa Xaa Xaa Xaa Xaa Xaa Xaa Xaa Xaa
    1415                1420                1425

Xaa Xaa Xaa Xaa Xaa Xaa Xaa Xaa Xaa Xaa Xaa Xaa Xaa Xaa Xaa
    1430                1435                1440

Xaa Xaa Xaa Xaa Xaa Xaa Xaa Xaa Xaa Xaa Xaa Xaa Xaa Xaa Xaa
    1445                1450                1455

Xaa Xaa Xaa Xaa Xaa Xaa Xaa Xaa Xaa Xaa Xaa Xaa Xaa Xaa Xaa
    1460                1465                1470

Xaa Xaa Xaa Xaa Xaa Xaa Xaa Xaa Xaa Xaa Xaa Xaa Xaa Xaa Xaa
    1475                1480                1485

Xaa Xaa Xaa Xaa Xaa Xaa Xaa Xaa Xaa Xaa Xaa Xaa Xaa Xaa Xaa
    1490                1495                1500

Xaa Xaa Xaa Xaa Xaa Xaa Xaa Xaa Xaa Xaa Xaa Xaa Xaa Xaa Xaa
    1505                1510                1515

Xaa Xaa Xaa Xaa Xaa Xaa Xaa Xaa Xaa Xaa Xaa Xaa Xaa Xaa Xaa
    1520                1525                1530

Xaa Xaa Xaa Xaa Xaa Xaa Xaa Xaa Xaa Xaa Xaa Xaa Xaa Xaa Xaa
    1535                1540                1545

Xaa Xaa Xaa Xaa Xaa Xaa Xaa Xaa Xaa Xaa Xaa Xaa Xaa Xaa Xaa
    1550                1555                1560

Xaa Xaa Xaa Xaa Xaa Xaa Xaa Xaa Xaa Xaa Xaa Xaa Xaa Xaa Xaa
    1565                1570                1575

Xaa Xaa Xaa Xaa Xaa Xaa Xaa Xaa Xaa Xaa Xaa Xaa Xaa Xaa Xaa
    1580                1585                1590

Xaa Xaa Xaa Xaa Xaa Xaa Xaa Xaa Xaa Xaa Xaa Xaa Xaa Xaa Xaa
    1595                1600                1605

Xaa Xaa Xaa Xaa Xaa Xaa Xaa Xaa Xaa Xaa Xaa Xaa Xaa Xaa Xaa

-continued

```
                    1610                1615                1620

Xaa Xaa  Xaa Xaa Xaa Xaa Xaa  Xaa Xaa Xaa Xaa Xaa  Xaa Xaa Xaa
    1625                1630                1635

Xaa Xaa  Xaa Xaa Xaa Xaa Xaa  Xaa Xaa Xaa Xaa Xaa  Xaa Xaa Xaa
    1640                1645                1650

Xaa Xaa  Xaa Xaa Xaa Xaa Xaa  Xaa Xaa Xaa Xaa Xaa  Xaa Xaa Xaa
    1655                1660                1665

Xaa Xaa  Xaa Xaa Xaa Xaa Xaa  Xaa Xaa Xaa Xaa Xaa  Xaa Xaa Xaa
    1670                1675                1680

Xaa Xaa  Xaa Xaa Xaa Xaa Xaa  Xaa Xaa Xaa Xaa Xaa  Xaa Xaa Xaa
    1685                1690                1695

Xaa Xaa  Xaa Xaa Xaa Xaa Xaa  Xaa Xaa Xaa Xaa Xaa  Xaa Xaa Xaa
    1700                1705                1710

Xaa Xaa  Xaa Xaa Xaa Xaa Xaa  Xaa Xaa Xaa Xaa Xaa  Xaa Xaa Xaa
    1715                1720                1725

Xaa Xaa  Xaa Xaa Xaa Xaa Xaa  Xaa Xaa Xaa Xaa Xaa  Xaa Xaa Xaa
    1730                1735                1740

Xaa Xaa  Xaa Xaa Xaa Xaa Xaa  Xaa Xaa Xaa Xaa Xaa  Xaa Xaa Xaa
    1745                1750                1755

Xaa Xaa  Xaa Xaa Xaa Xaa Xaa  Xaa Xaa Xaa Xaa Xaa  Xaa Xaa Xaa
    1760                1765                1770

Xaa Xaa  Xaa Xaa Xaa Xaa Xaa  Xaa Xaa Xaa Xaa Xaa  Xaa Xaa Xaa
    1775                1780                1785

Xaa Xaa  Xaa Xaa Xaa Xaa Xaa  Xaa Xaa Xaa Xaa Xaa  Xaa Xaa Xaa
    1790                1795                1800

Xaa Xaa  Xaa Xaa Xaa Xaa Xaa  Xaa Xaa Xaa Xa

```
Xaa Xaa Xaa Xaa Xaa Xaa Xaa  Xaa Xaa Xaa Xaa Xaa  Xaa Xaa Xaa
    2015            2020                2025

Xaa Xaa Xaa Xaa Xaa Xaa Xaa  Xaa Xaa Xaa Xaa Xaa  Xaa Xaa Xaa
    2030            2035                2040

Xaa Xaa Xaa Xaa Xaa Xaa Xaa  Xaa Cys Xaa Xaa Xaa  Xaa Xaa Xaa
    2045            2050                2055

Xaa Xaa Xaa Xaa Xaa Xaa Xaa  Xaa Xaa Xaa Xaa Xaa  Xaa Xaa Xaa
    2060            2065                2070

Xaa Xaa Cys Xaa Xaa Xaa Xaa  Xaa Xaa Xaa Xaa Xaa  Cys Cys Xaa
    2075            2080                2085

Xaa Xaa Xaa Xaa Xaa Xaa Xaa  Xaa Xaa Xaa Xaa Xaa  Xaa Xaa Xaa
    2090            2095                2100

Xaa Xaa Cys Xaa Xaa Xaa Xaa  Xaa Xaa Xaa Xaa Xaa  Xaa Xaa Xaa
    2105            2110                2115

Xaa Xaa Xaa Xaa Xaa Xaa Xaa  Xaa Xaa Xaa Xaa Xaa  Xaa Xaa Xaa
    2120            2125                2130

Xaa Xaa Xaa Xaa Xaa Xaa Xaa  Xaa Xaa Xaa Xaa Xaa  Xaa Xaa Xaa
    2135            2140                2145

Xaa Xaa Xaa Xaa Xaa Xaa Xaa  Xaa Xaa Xaa Xaa Xaa  Xaa Xaa Xaa
    2150            2155                2160

Xaa Xaa Xaa Xaa Xaa Xaa Xaa  Xaa Xaa Xaa Xaa Xaa  Xaa Xaa Xaa
    2165            2170                2175

Xaa Xaa Xaa Xaa Xaa Xaa Xaa  Xaa Xaa Xaa Xaa Xaa  Xaa Xaa Xaa
    2180            2185                2190

Xaa Xaa Xaa Xaa Xaa Xaa Xaa  Xaa Xaa Xaa Xaa Xaa  Xaa Xaa Xaa
    2195            2200                2205

Xaa Xaa Xaa Xaa Xaa Xaa Xaa  Xaa Xaa Xaa Xaa Xaa  Xaa Xaa Xaa
    2210            2215                2220

Xaa Xaa Xaa Xaa Xaa Xaa Xaa  Xaa Xaa Xaa Xaa Xaa  Xaa Xaa Xaa
    2225            2230                2235

Xaa Xaa Xaa Xaa Xaa Xaa Xaa  Xaa Xaa Xaa Xaa Xaa  Xaa Xaa Xaa
    2240            2245                2250

Xaa Xaa Xaa Xaa Xaa Xaa Xaa  Xaa Xaa Xaa Xaa Xaa  Xaa Xaa Xaa
    2255            2260                2265

Xaa Xaa Xaa Xaa Xaa Xaa Xaa  Xaa Xaa Xaa Xaa Xaa  Xaa Xaa Xaa
    2270            2275                2280

Xaa Xaa Xaa Xaa Xaa Xaa Xaa  Xaa Xaa Xaa Xaa Xaa  Xaa Xaa Xaa
    2285            2290                2295

Xaa Xaa Xaa Xaa Xaa Xaa Xaa  Xaa Xaa Xaa Xaa Xaa  Xaa Xaa Xaa
    2300            2305                2310

Xaa Xaa Xaa Xaa Xaa Xaa Xaa  Xaa Xaa Xaa Xaa Xaa  Xaa Xaa Xaa
    2315            2320                2325

Xaa Xaa Xaa Xaa Xaa Xaa Xaa  Xaa Xaa Xaa Xaa Xaa  Xaa Xaa Xaa
    2330            2335                2340

Xaa Xaa Xaa Xaa Xaa Xaa Xaa  Xaa Xaa Xaa Xaa Xaa  Cys Xaa Xaa
    2345            2350                2355

Xaa Xaa Xaa Xaa Xaa Xaa Xaa  Xaa Xaa Xaa Xaa Xaa  Xaa Xaa Xaa
    2360            2365                2370

Xaa Xaa Xaa Xaa Xaa Xaa Xaa  Xaa Xaa Xaa Xaa Xaa  Xaa Xaa Xaa
    2375            2380                2385

Xaa Xaa Xaa Xaa Xaa Xaa Xaa  Xaa Xaa Xaa Xaa Xaa  Xaa Xaa Xaa
    2390            2395                2400

Xaa Xaa Xaa Xaa Xaa Xaa Xaa  Xaa Xaa Xaa Xaa Xaa  Xaa Xaa Xaa
    2405            2410                2415
```

```
Xaa Xaa Xaa Xaa Xaa Xaa Xaa  Xaa Xaa Xaa Xaa Xaa  Xaa Xaa Xaa
    2420                2425                2430

Xaa Xaa Xaa Xaa Xaa Xaa Xaa  Xaa Xaa Xaa Xaa Xaa  Xaa Xaa Xaa
    2435                2440                2445

Xaa Xaa Xaa Xaa Xaa Xaa Xaa  Xaa Xaa Xaa Xaa Xaa  Xaa Xaa Xaa
    2450                2455                2460

Xaa Xaa Xaa Xaa Xaa Xaa Xaa  Xaa Xaa Xaa Xaa Xaa  Xaa Xaa Xaa
    2465                2470                2475

Xaa Xaa Xaa Xaa Xaa Xaa Xaa  Xaa Xaa Xaa Xaa Xaa  Xaa Xaa Xaa
    2480                2485                2490

Xaa Xaa Xaa Xaa Xaa Xaa Xaa  Xaa Xaa Xaa Xaa Xaa  Xaa Xaa Xaa
    2495                2500                2505

Xaa Xaa Xaa Xaa Xaa Xaa Xaa  Xaa Xaa Xaa Xaa Xaa  Xaa Xaa Xaa
    2510                2515                2520

Xaa Xaa Xaa Xaa Xaa Xaa Xaa  Xaa Xaa Xaa Xaa Xaa  Xaa Xaa Xaa
    2525                2530                2535

Xaa Xaa Xaa Xaa Xaa Xaa Xaa  Xaa Xaa Xaa Xaa Xaa  Xaa Xaa Xaa
    2540                2545                2550

Xaa Xaa Xaa Xaa Xaa Xaa Xaa  Xaa Xaa Xaa Xaa Xaa  Xaa Xaa Xaa
    2555                2560                2565

Xaa Xaa Xaa Xaa Xaa Xaa Xaa  Xaa Xaa Xaa Xaa Xaa  Xaa Xaa Xaa
    2570                2575                2580

Xaa Xaa Xaa Xaa Xaa Xaa Xaa  Xaa Xaa Xaa Xaa Xaa  Xaa Xaa Xaa
    2585                2590                2595

Xaa Xaa Xaa Xaa Xaa Xaa Xaa  Xaa Xaa Xaa Xaa Xaa  Xaa Xaa Xaa
    2600                2605                2610

Xaa Xaa Xaa Xaa Xaa Xaa Xaa  Xaa Xaa Xaa Xaa Xaa  Xaa Xaa Xaa
    2615                2620                2625

Xaa Xaa Xaa Xaa Xaa Xaa Xaa  Xaa Xaa Xaa Xaa Xaa  Xaa Xaa Xaa
    2630                2635                2640

Xaa Xaa Xaa Xaa Xaa Xaa Xaa  Xaa Xaa Xaa Xaa Xaa  Xaa Xaa Xaa
    2645                2650                2655

Xaa Xaa Xaa Xaa Xaa Xaa Xaa  Xaa Xaa Xaa Xaa Xaa  Xaa Xaa Xaa
    2660                2665                2670

Xaa Xaa Xaa Xaa Xaa Xaa Xaa  Xaa Xaa Xaa Xaa Xaa  Xaa Xaa Xaa
    2675                2680                2685

Xaa Xaa Xaa Xaa Xaa Xaa Xaa  Xaa Xaa Xaa Xaa Xaa  Xaa Xaa Xaa
    2690                2695                2700

Xaa Xaa Xaa Xaa Xaa Xaa Xaa  Xaa Xaa Xaa Xaa Xaa  Xaa Xaa Xaa
    2705                2710                2715

Xaa Xaa Xaa Xaa Xaa Xaa Xaa  Xaa Xaa Xaa Xaa Xaa  Xaa Xaa Xaa
    2720                2725                2730

Xaa Xaa Xaa Xaa Xaa Xaa Xaa  Xaa Xaa Xaa Xaa Xaa  Xaa Xaa Xaa
    2735                2740                2745

Xaa Xaa Xaa Xaa Xaa Xaa Xaa  Xaa Xaa Xaa Xaa Xaa  Xaa Xaa Xaa
    2750                2755                2760

Xaa Xaa Xaa Xaa Xaa Xaa Xaa  Xaa Xaa Xaa Xaa Xaa  Xaa Xaa Xaa
    2765                2770                2775

Xaa Xaa Xaa Xaa Xaa Xaa Xaa  Xaa Xaa Xaa Xaa Xaa  Xaa Xaa Xaa
    2780                2785                2790

Xaa Xaa Xaa Xaa Xaa Xaa Xaa  Xaa Xaa Xaa Xaa Xaa  Xaa Xaa Xaa
    2795                2800                2805

Xaa Xaa  Xaa Xaa Xaa Xaa Xaa  Xaa Xaa Xaa Xaa Xaa  Xaa Xaa Xaa
```

-continued

```
            2810                2815                2820

Xaa Xaa Xaa Xaa Xaa Xaa Xaa  Xaa Xaa Xaa Xaa Xaa  Xaa Xaa Xaa
    2825                2830                2835

Xaa Xaa Xaa Xaa Xaa Xaa Xaa  Xaa Xaa Xaa Xaa Xaa  Xaa Xaa Xaa
    2840                2845                2850

Xaa Xaa Xaa Xaa Xaa Xaa Xaa  Xaa Xaa Xaa Xaa Xaa  Xaa Xaa Xaa
    2855                2860                2865

Xaa Xaa Xaa Xaa Xaa Xaa Xaa  Xaa Xaa Xaa Xaa Xaa  Xaa Xaa Xaa
    2870                2875                2880

Xaa Xaa Xaa Xaa Xaa Xaa Xaa  Xaa Xaa Xaa Xaa Xaa  Xaa Xaa Xaa
    2885                2890                2895

Xaa Xaa Xaa Xaa Xaa Xaa Xaa  Xaa Xaa Xaa Xaa Xaa  Xaa Xaa Xaa
    2900                2905                2910

Xaa Xaa Xaa Xaa Xaa Xaa Xaa  Xaa Xaa Xaa Xaa Xaa  Xaa Xaa Xaa
    2915                2920                2925

Xaa Xaa Xaa Xaa Xaa Xaa Xaa  Xaa Xaa Xaa Xaa Xaa  Xaa Xaa Xaa
    2930                2935                2940

Xaa Xaa Xaa Xaa Xaa Xaa Xaa  Xaa Xaa Xaa Xaa Xaa  Xaa Xaa Xaa
    2945                2950                2955

Xaa Xaa Xaa Xaa Xaa Xaa Xaa  Xaa Xaa Xaa Xaa Xaa  Xaa Xaa Xaa
    2960                2965                2970

Xaa Xaa Xaa Xaa Xaa Xaa Xaa  Xaa Xaa Xaa Xaa Xaa  Xaa Xaa Xaa
    2975                2980                2985

Xaa Xaa Xaa Xaa Xaa Xaa Xaa  Xaa Xaa Xaa Xaa Xaa  Xaa Xaa Xaa
    2990                2995                3000

Xaa Xaa Xaa Xaa Xaa Xaa Xaa  Xaa Xaa Xaa Xaa Xaa  Xaa Xaa Xaa
    3005                3010                3015

Xaa Xaa Xaa Xaa Xaa Xaa Xaa  Xaa Xaa Xaa Xaa Xaa  Xaa Xaa Xaa
    3020                3025                3030

Xaa Xaa Xaa Xaa Xaa Xaa Xaa  Xaa Xaa Xaa Xaa Xaa  Xaa Xaa Xaa
    3035                3040                3045

Xaa Xaa Xaa Xaa Xaa Xaa Xaa  Xaa Xaa Xaa Xaa Xaa  Xaa Xaa Xaa
    3050                3055                3060

Xaa Xaa Xaa Xaa Xaa Xaa Xaa  Xaa Xaa Xaa Xaa Xaa  Xaa Xaa Xaa
    3065                3070                3075

Xaa Xaa Xaa Xaa Xaa Xaa Xaa  Xaa Xaa Xaa Xaa Xaa  Xaa Xaa Xaa
    3080                3085                3090

Xaa Xaa Xaa Xaa Xaa Xaa Xaa  Xaa Xaa Xaa Xaa Xaa  Xaa Xaa Xaa
    3095                3100                3105

Xaa Xaa Xaa Xaa Xaa Xaa Xaa  Xaa Xaa Xaa Xaa Xaa  Xaa Xaa Xaa
    3110                3115                3120

Xaa Xaa Xaa Xaa Xaa Xaa Xaa  Xaa Xaa Xaa Xaa Xaa  Xaa Xaa Xaa
    3125                3130                3135

Xaa Xaa Xaa Xaa Xaa Xaa Xaa  Xaa Xaa Xaa Xaa Xaa  Xaa Xaa Xaa
    3140                3145                3150

Xaa Xaa Xaa Xaa Xaa Xaa Xaa  Xaa Xaa Xaa Xaa Xaa  Xaa Xaa Xaa
    3155                3160                3165

Xaa Xaa Xaa Xaa Xaa Xaa Xaa  Xaa Xaa Xaa Xaa Xaa  Xaa Xaa Xaa
    3170                3175                3180

Xaa Xaa Xaa Xaa Xaa Xaa Xaa  Xaa Xaa Xaa Xaa Xaa  Xaa Xaa Xaa
    3185                3190                3195

Xaa Xaa Xaa Xaa Xaa Xaa Xaa  Xaa Xaa Xaa Xaa Xaa  Xaa Xaa Xaa
    3200                3205                3210
```

-continued

Xaa Xaa Xaa Xaa Xaa Xaa Xaa Xaa Xaa Xaa Xaa Xaa Xaa Xaa Xaa
    3215                3220                3225

Xaa Xaa Xaa Xaa Xaa Xaa Xaa Xaa Xaa Xaa Xaa Xaa Xaa Xaa Xaa
    3230                3235                3240

Xaa Xaa Xaa Xaa Xaa Xaa Xaa Xaa Xaa Xaa Xaa Xaa Xaa Xaa Xaa
    3245                3250                3255

Xaa Xaa Xaa Xaa Xaa Xaa Xaa Xaa Xaa Xaa Xaa Xaa Xaa Xaa Xaa
    3260                3265                3270

Xaa Xaa Xaa Xaa Xaa Xaa Xaa Xaa Xaa Xaa Xaa Xaa Xaa Xaa Xaa
    3275                3280                3285

Xaa Xaa Xaa Xaa Xaa Xaa Xaa Xaa Xaa Xaa Xaa Xaa Xaa Xaa Xaa
    3290                3295                3300

Xaa Xaa Xaa Xaa Xaa Xaa Xaa Xaa Xaa Xaa Xaa Xaa Xaa Xaa Xaa
    3305                3310                3315

Xaa Xaa Xaa Xaa Xaa Xaa Xaa Xaa Xaa Xaa Xaa Xaa Xaa Xaa Xaa
    3320                3325                3330

Xaa Xaa Xaa Xaa Xaa Xaa Xaa Xaa Xaa Xaa Xaa Xaa Xaa Xaa Xaa
    3335                3340                3345

Xaa Xaa Xaa Xaa Xaa Xaa Xaa Xaa Xaa Xaa Xaa Xaa Xaa Xaa Xaa
    3350                3355                3360

Xaa Xaa Xaa Xaa Xaa Xaa Xaa Xaa Xaa Xaa Xaa Xaa Xaa Xaa Xaa
    3365                3370                3375

Xaa Xaa Xaa Xaa Xaa Xaa Xaa Xaa Xaa Xaa Xaa Xaa Xaa Xaa Xaa
    3380                3385                3390

Xaa Xaa Xaa Xaa Xaa Xaa Xaa Xaa Xaa Xaa Xaa Xaa Xaa Xaa Xaa
    3395                3400                3405

Xaa Xaa Xaa Xaa Xaa Xaa Xaa Xaa Xaa Xaa Xaa Xaa Xaa Xaa Xaa
    3410                3415                3420

Xaa Xaa Xaa Xaa Xaa Xaa Xaa Xaa Xaa Xaa Xaa Xaa Xaa Xaa Xaa
    3425                3430                3435

Xaa Xaa Xaa Xaa Xaa Xaa Xaa Xaa Xaa Xaa Xaa Xaa Xaa Xaa Xaa
    3440                3445                3450

Xaa Xaa Xaa Xaa Xaa Xaa Xaa Xaa Xaa Xaa Xaa Xaa Xaa Xaa Xaa
    3455                3460                3465

Xaa Xaa Xaa Xaa Xaa Xaa Xaa Xaa Xaa Xaa Xaa Xaa Xaa Xaa Xaa
    3470                3475                3480

Xaa Xaa Xaa Xaa Xaa Xaa Xaa Xaa Xaa Xaa Xaa Xaa Xaa Xaa Xaa
    3485                3490                3495

Xaa Xaa Xaa Xaa Xaa Xaa Xaa Xaa Xaa Xaa Xaa Xaa Xaa Xaa Xaa
    3500                3505                3510

Xaa Xaa Xaa Xaa Xaa Xaa Xaa Xaa Xaa Xaa Xaa Xaa Xaa Xaa Xaa
    3515                3520                3525

Xaa Xaa Xaa Xaa Xaa Xaa Xaa Xaa Xaa Xaa Xaa Xaa Xaa Xaa Xaa
    3530                3535                3540

Xaa Xaa Xaa Xaa Xaa Xaa Xaa Xaa Xaa Xaa Xaa Xaa Xaa Xaa Xaa
    3545                3550                3555

Xaa Xaa Xaa Xaa Xaa Xaa Xaa Xaa Xaa Xaa Xaa Xaa Xaa Xaa Xaa
    3560                3565                3570

Xaa Xaa Xaa Xaa Xaa Xaa Xaa Xaa Xaa Xaa Xaa Xaa Xaa Xaa Xaa
    3575                3580                3585

Xaa Xaa Xaa Xaa Xaa Xaa Xaa Xaa Xaa Xaa Xaa Xaa Xaa Xaa Xaa
    3590                3595                3600

Xaa Xaa Xaa Xaa Xaa Xaa Xaa Xaa Xaa Xaa Xaa Xaa Xaa Xaa Xaa
    3605                3610                3615

-continued

Xaa Xaa Xaa Xaa Xaa Xaa Xaa   Xaa Xaa Xaa Xaa Xaa   Xaa Xaa Xaa
         3620                3625                3630

Xaa Xaa Xaa Xaa Xaa Xaa Xaa   Xaa Xaa Xaa Xaa Xaa   Xaa Xaa Xaa
         3635                3640                3645

Xaa Xaa Xaa Xaa Xaa Xaa Xaa   Xaa Xaa Xaa Xaa Xaa   Xaa Xaa Xaa
         3650                3655                3660

Xaa Xaa Xaa Xaa Xaa Xaa Xaa   Xaa Xaa Xaa Xaa Xaa   Xaa Xaa Xaa
         3665                3670                3675

Xaa Xaa Xaa Xaa Xaa Xaa Xaa   Xaa Xaa Xaa Xaa Xaa   Xaa Xaa Xaa
         3680                3685                3690

Xaa Xaa Xaa Xaa Xaa Xaa Xaa   Xaa Xaa Xaa Xaa Xaa   Xaa Xaa Xaa
         3695                3700                3705

Xaa Xaa Xaa Xaa Xaa Xaa Xaa   Xaa Xaa Xaa Xaa Xaa   Xaa Xaa Xaa
         3710                3715                3720

Xaa Xaa Xaa Xaa Xaa Xaa Xaa   Xaa Xaa Xaa Xaa Xaa   Xaa Xaa Xaa
         3725                3730                3735

Xaa Xaa Xaa Xaa Xaa Xaa Xaa   Xaa Xaa Xaa Xaa Xaa   Xaa Xaa Xaa
         3740                3745                3750

Xaa Xaa Xaa Xaa Xaa Xaa Xaa   Xaa Xaa Xaa Xaa Xaa   Xaa Xaa Xaa
         3755                3760                3765

Xaa Xaa Xaa Xaa Xaa Xaa Xaa   Xaa Xaa Xaa Xaa Xaa   Xaa Xaa Xaa
         3770                3775                3780

Xaa Xaa Xaa Xaa Xaa Xaa Xaa   Xaa Xaa Xaa Xaa Xaa   Xaa Xaa Xaa
         3785                3790                3795

Xaa Xaa Xaa Xaa Xaa Xaa Xaa   Xaa Xaa Xaa Xaa Xaa   Xaa Xaa Xaa
         3800                3805                3810

Xaa Xaa Xaa Xaa Xaa Xaa Xaa   Xaa Xaa Xaa Xaa Xaa   Xaa Xaa Xaa
         3815                3820                3825

Xaa Xaa Xaa Xaa Xaa Xaa Xaa   Xaa Xaa Xaa Xaa Xaa   Xaa Xaa Xaa
         3830                3835                3840

Xaa Xaa Xaa Xaa Xaa Xaa Xaa   Xaa Xaa Xaa Xaa Xaa   Xaa Xaa Xaa
         3845                3850                3855

Xaa Xaa Xaa Xaa Xaa Xaa Xaa   Xaa Xaa Xaa Xaa Xaa   Xaa Xaa Xaa
         3860                3865                3870

Xaa Xaa Xaa Xaa Xaa Xaa Xaa   Xaa Xaa Xaa Xaa Xaa   Xaa Xaa Xaa
         3875                3880                3885

Xaa Xaa Xaa Xaa Xaa Xaa Xaa   Xaa Xaa Xaa Xaa Xaa   Xaa Xaa Xaa
         3890                3895                3900

Xaa Xaa Xaa Xaa Xaa Xaa Xaa   Xaa Xaa Xaa Xaa Xaa   Xaa Xaa Xaa
         3905                3910                3915

Xaa Xaa Xaa Xaa Xaa Xaa Xaa   Xaa Xaa Xaa Xaa Xaa   Xaa Xaa Xaa
         3920                3925                3930

Xaa Xaa Xaa Xaa Xaa Xaa Xaa   Xaa Xaa Xaa Xaa Xaa   Xaa Xaa Xaa
         3935                3940                3945

Xaa Xaa Xaa Xaa Xaa Xaa Xaa   Xaa Xaa Xaa Xaa Xaa   Xaa Xaa Xaa
         3950                3955                3960

Xaa Xaa Xaa Xaa Xaa Xaa Xaa   Xaa Xaa Xaa Xaa Xaa   Xaa Xaa Xaa
         3965                3970                3975

Xaa Xaa Xaa Xaa Xaa Xaa Xaa   Xaa Xaa Xaa Xaa Xaa   Xaa Xaa Xaa
         3980                3985                3990

Xaa Xaa Xaa Xaa Xaa Xaa Xaa   Xaa Xaa Xaa Xaa Xaa   Xaa Xaa Xaa
         3995                4000                4005

Xaa Xaa Xaa Xaa Xaa Xaa Xaa   Xaa Xaa Xaa Xaa Xaa   Xaa Xaa Xaa

```
                4010            4015            4020

Xaa Xaa  Xaa Xaa Xaa Xaa Xaa  Xaa Xaa Xaa Xaa Xaa  Xaa Xaa Xaa
        4025            4030            4035

Xaa Xaa  Xaa Xaa Xaa Xaa Xaa  Xaa Xaa Xaa Xaa Xaa  Xaa Xaa Xaa
        4040            4045            4050

Xaa Xaa  Xaa Xaa Xaa Xaa Xaa  Xaa Xaa Xaa Xaa Xaa  Xaa Xaa Xaa
        4055            4060            4065

Xaa Xaa  Xaa Xaa Xaa Xaa Xaa  Xaa Xaa Xaa Xaa Xaa  Xaa Xaa Xaa
        4070            4075            4080

Xaa Xaa  Xaa Xaa Xaa Xaa Xaa  Xaa Xaa Xaa Xaa Xaa  Xaa Xaa Xaa
        4085            4090            4095

Xaa Xaa  Xaa Xaa Xaa Xaa Xaa  Xaa
        4100            4105

<210> SEQ ID NO 2
<211> LENGTH: 4367
<212> TYPE: PRT
<213> ORGANISM: Artificial Sequence
<220> FEATURE:
<223> OTHER INFORMATION: Hydrophobin
<220> FEATURE:
<221> NAME/KEY: MISC_FEATURE
<222> LOCATION: (1)..(2000)
<223> OTHER INFORMATION: Xaa may be any amino acid; One or more Xaa
      may be missing
<220> FEATURE:
<221> NAME/KEY: MISC_FEATURE
<222> LOCATION: (2002)..(2002)
<223> OTHER INFORMATION: Xaa may be any amino acid;
<220> FEATURE:
<221> NAME/KEY: MISC_FEATURE
<222> LOCATION: (2003)..(2051)
<223> OTHER INFORMATION: Xaa may be any amino acid; One or more Xaa
      may be missing
<220> FEATURE:
<221> NAME/KEY: MISC_FEATURE
<222> LOCATION: (2053)..(2057)
<223> OTHER INFORMATION: Xaa may be any amino acid; One or more Xaa
      may be missing
<220> FEATURE:
<221> NAME/KEY: MISC_FEATURE
<222> LOCATION: (2059)..(2059)
<223> OTHER INFORMATION: Xaa may be any amino acid;
<220> FEATURE:
<221> NAME/KEY: MISC_FEATURE
<222> LOCATION: (2060)..(2158)
<223> OTHER INFORMATION: Xaa may be any amino acid; One or more Xaa
      may be missing
<220> FEATURE:
<221> NAME/KEY: MISC_FEATURE
<222> LOCATION: (2160)..(2160)
<223> OTHER INFORMATION: Xaa may be any amino acid;
<220> FEATURE:
<221> NAME/KEY: MISC_FEATURE
<222> LOCATION: (2161)..(2259)
<223> OTHER INFORMATION: Xaa may be any amino acid; One or more Xaa
      may be missing
<220> FEATURE:
<221> NAME/KEY: MISC_FEATURE
<222> LOCATION: (2260)..(2260)
<223> OTHER INFORMATION: Xaa may be any amino acid;
<220> FEATURE:
<221> NAME/KEY: MISC_FEATURE
<222> LOCATION: (2261)..(2309)
<223> OTHER INFORMATION: Xaa may be any amino acid; One or more Xaa
      may be missing.
<220> FEATURE:
<221> NAME/KEY: MISC_FEATURE
<222> LOCATION: (2311)..(2315)
<223> OTHER INFORMATION: Xaa may be any amino acid; One or more Xaa
      may be missing.
<220> FEATURE:
<221> NAME/KEY: MISC_FEATURE
```

```
<222> LOCATION: (2317)..(2317)
<223> OTHER INFORMATION: Xaa may be any amino acid;
<220> FEATURE:
<221> NAME/KEY: MISC_FEATURE
<222> LOCATION: (2318)..(2366)
<223> OTHER INFORMATION: Xaa may be any amino acid; One or more Xaa
      may be missing.
<220> FEATURE:
<221> NAME/KEY: MISC_FEATURE
<222> LOCATION: (2368)..(4367)
<223> OTHER INFORMATION: Xaa may be any amino acid; One or more Xaa
      may be missing.

<400> SEQUENCE: 2

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa Xaa
    50                  55                  60

Xaa Xaa Xaa Xaa Xaa Xaa Xaa Xaa Xaa Xaa Xaa Xaa Xaa Xaa Xaa Xaa
65                  70                  75                  80

Xaa Xaa Xaa Xaa Xaa Xaa Xaa Xaa Xaa Xaa Xaa Xaa Xaa Xaa Xaa Xaa
                85                  90                  95

Xaa Xaa Xaa Xaa Xaa Xaa Xaa Xaa Xaa Xaa Xaa Xaa Xaa Xaa Xaa Xaa
            100                 105                 110

Xaa Xaa Xaa Xaa Xaa Xaa Xaa Xaa Xaa Xaa Xaa Xaa Xaa Xaa Xaa Xaa
        115                 120                 125

Xaa Xaa Xaa Xaa Xaa Xaa Xaa Xaa Xaa Xaa Xaa Xaa Xaa Xaa Xaa Xaa
    130                 135                 140

Xaa Xaa Xaa Xaa Xaa Xaa Xaa Xaa Xaa Xaa Xaa Xaa Xaa Xaa Xaa Xaa
145                 150                 155                 160

Xaa Xaa Xaa Xaa Xaa Xaa Xaa Xaa Xaa Xaa Xaa Xaa Xaa Xaa Xaa Xaa
                165                 170                 175

Xaa Xaa Xaa Xaa Xaa Xaa Xaa Xaa Xaa Xaa Xaa Xaa Xaa Xaa Xaa Xaa
            180                 185                 190

Xaa Xaa Xaa Xaa Xaa Xaa Xaa Xaa Xaa Xaa Xaa Xaa Xaa Xaa Xaa Xaa
        195                 200                 205

Xaa Xaa Xaa Xaa Xaa Xaa Xaa Xaa Xaa Xaa Xaa Xaa Xaa Xaa Xaa Xaa
    210                 215                 220

Xaa Xaa Xaa Xaa Xaa Xaa Xaa Xaa Xaa Xaa Xaa Xaa Xaa Xaa Xaa Xaa
225                 230                 235                 240

Xaa Xaa Xaa Xaa Xaa Xaa Xaa Xaa Xaa Xaa Xaa Xaa Xaa Xaa Xaa Xaa
                245                 250                 255

Xaa Xaa Xaa Xaa Xaa Xaa Xaa Xaa Xaa Xaa Xaa Xaa Xaa Xaa Xaa Xaa
            260                 265                 270

Xaa Xaa Xaa Xaa Xaa Xaa Xaa Xaa Xaa Xaa Xaa Xaa Xaa Xaa Xaa Xaa
        275                 280                 285

Xaa Xaa Xaa Xaa Xaa Xaa Xaa Xaa Xaa Xaa Xaa Xaa Xaa Xaa Xaa Xaa
    290                 295                 300

Xaa Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa Xaa
                325                 330                 335

Xaa Xaa Xaa Xaa Xaa Xaa Xaa Xaa Xaa Xaa Xaa Xaa Xaa Xaa Xaa Xaa
            340                 345                 350
```

-continued

```
Xaa Xaa Xaa Xaa Xaa Xaa Xaa Xaa Xaa Xaa Xaa Xaa Xaa Xaa Xaa
        355                 360                 365

Xaa Xaa Xaa Xaa Xaa Xaa Xaa Xaa Xaa Xaa Xaa Xaa Xaa Xaa Xaa
        370                 375                 380

Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa Xaa Xaa Xaa Xaa Xaa Xaa
        405                 410                 415

Xaa Xaa Xaa Xaa Xaa Xaa Xaa Xaa Xaa Xaa Xaa Xaa Xaa Xaa Xaa
        420                 425                 430

Xaa Xaa Xaa Xaa Xaa Xaa Xaa Xaa Xaa Xaa Xaa Xaa Xaa Xaa Xaa
        435                 440                 445

Xaa Xaa Xaa Xaa Xaa Xaa Xaa Xaa Xaa Xaa Xaa Xaa Xaa Xaa Xaa
        450                 455                 460

Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa
        485                 490                 495

Xaa Xaa Xaa Xaa Xaa Xaa Xaa Xaa Xaa Xaa Xaa Xaa Xaa Xaa Xaa
        500                 505                 510

Xaa Xaa Xaa Xaa Xaa Xaa Xaa Xaa Xaa Xaa Xaa Xaa Xaa Xaa Xaa
        515                 520                 525

Xaa Xaa Xaa Xaa Xaa Xaa Xaa Xaa Xaa Xaa Xaa Xaa Xaa Xaa Xaa
        530                 535                 540

Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa
        565                 570                 575

Xaa Xaa Xaa Xaa Xaa Xaa Xaa Xaa Xaa Xaa Xaa Xaa Xaa Xaa Xaa
        580                 585                 590

Xaa Xaa Xaa Xaa Xaa Xaa Xaa Xaa Xaa Xaa Xaa Xaa Xaa Xaa Xaa
        595                 600                 605

Xaa Xaa Xaa Xaa Xaa Xaa Xaa Xaa Xaa Xaa Xaa Xaa Xaa Xaa Xaa
        610                 615                 620

Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa
        645                 650                 655

Xaa Xaa Xaa Xaa Xaa Xaa Xaa Xaa Xaa Xaa Xaa Xaa Xaa Xaa Xaa
        660                 665                 670

Xaa Xaa Xaa Xaa Xaa Xaa Xaa Xaa Xaa Xaa Xaa Xaa Xaa Xaa Xaa
        675                 680                 685

Xaa Xaa Xaa Xaa Xaa Xaa Xaa Xaa Xaa Xaa Xaa Xaa Xaa Xaa Xaa
        690                 695                 700

Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa
        725                 730                 735

Xaa Xaa Xaa Xaa Xaa Xaa Xaa Xaa Xaa Xaa Xaa Xaa Xaa Xaa Xaa
        740                 745                 750

Xaa Xaa Xaa Xaa Xaa Xaa Xaa Xaa Xaa Xaa Xaa Xaa Xaa Xaa Xaa
        755                 760                 765

Xaa Xaa Xaa Xaa Xaa Xaa Xaa Xaa Xaa Xaa Xaa Xaa Xaa Xaa Xaa
```

-continued

```
                770                 775                 780
Xaa Xaa Xaa Xaa Xaa Xaa Xaa Xaa Xaa Xaa Xaa Xaa Xaa Xaa Xaa
785                 790                 795                 800

Xaa Xaa Xaa Xaa Xaa Xaa Xaa Xaa Xaa Xaa Xaa Xaa Xaa Xaa Xaa
            805                 810                 815

Xaa Xaa Xaa Xaa Xaa Xaa Xaa Xaa Xaa Xaa Xaa Xaa Xaa Xaa Xaa
            820                 825                 830

Xaa Xaa Xaa Xaa Xaa Xaa Xaa Xaa Xaa Xaa Xaa Xaa Xaa Xaa Xaa
            835                 840                 845

Xaa Xaa Xaa Xaa Xaa Xaa Xaa Xaa Xaa Xaa Xaa Xaa Xaa Xaa Xaa
850                 855                 860

Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa
            885                 890                 895

Xaa Xaa Xaa Xaa Xaa Xaa Xaa Xaa Xaa Xaa Xaa Xaa Xaa Xaa Xaa
            900                 905                 910

Xaa Xaa Xaa Xaa Xaa Xaa Xaa Xaa Xaa Xaa Xaa Xaa Xaa Xaa Xaa
        915                 920                 925

Xaa Xaa Xaa Xaa Xaa Xaa Xaa Xaa Xaa Xaa Xaa Xaa Xaa Xaa Xaa
            930                 935                 940

Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa
            965                 970                 975

Xaa Xaa Xaa Xaa Xaa Xaa Xaa Xaa Xaa Xaa Xaa Xaa Xaa Xaa Xaa
            980                 985                 990

Xaa Xaa Xaa Xaa Xaa Xaa Xaa  Xaa Xaa Xaa Xaa Xaa  Xaa Xaa Xaa
        995                 1000                1005

Xaa Xaa  Xaa Xaa Xaa Xaa Xaa  Xaa Xaa Xaa Xaa Xaa  Xaa Xaa Xaa
    1010                1015                1020

Xaa Xaa  Xaa Xaa Xaa Xaa Xaa  Xaa Xaa Xaa Xaa Xaa  Xaa Xaa Xaa
    1025                1030                1035

Xaa Xaa  Xaa Xaa Xaa Xaa Xaa  Xaa Xaa Xaa Xaa Xaa  Xaa Xaa Xaa
    1040                1045                1050

Xaa Xaa  Xaa Xaa Xaa Xaa Xaa  Xaa Xaa Xaa Xaa Xaa  Xaa Xaa Xaa
    1055                1060                1065

Xaa Xaa  Xaa Xaa Xaa Xaa Xaa  Xaa Xaa Xaa Xaa Xaa  Xaa Xaa Xaa
    1070                1075                1080

Xaa Xaa  Xaa Xaa Xaa Xaa Xaa  Xaa Xaa Xaa Xaa Xaa  Xaa Xaa Xaa
    1085                1090                1095

Xaa Xaa  Xaa Xaa Xaa Xaa Xaa  Xaa Xaa Xaa Xaa Xaa  Xaa Xaa Xaa
    1100                1105                1110

Xaa Xaa  Xaa Xaa Xaa Xaa Xaa  Xaa Xaa Xaa Xaa Xaa  Xaa Xaa Xaa
    1115                1120                1125

Xaa Xaa  Xaa Xaa Xaa Xaa Xaa  Xaa Xaa Xaa Xaa Xaa  Xaa Xaa Xaa
    1130                1135                1140

Xaa Xaa  Xaa Xaa Xaa Xaa Xaa  Xaa Xaa Xaa Xaa Xaa  Xaa Xaa Xaa
    1145                1150                1155

Xaa Xaa  Xaa Xaa Xaa Xaa Xaa  Xaa Xaa Xaa Xaa Xaa  Xaa Xaa Xaa
    1160                1165                1170

Xaa Xaa  Xaa Xaa Xaa Xaa Xaa  Xaa Xaa Xaa Xaa Xaa  Xaa Xaa Xaa
    1175                1180                1185
```

-continued

Xaa Xaa Xaa Xaa Xaa Xaa Xaa Xaa Xaa Xaa Xaa Xaa Xaa Xaa Xaa
    1190                1195                1200

Xaa Xaa Xaa Xaa Xaa Xaa Xaa Xaa Xaa Xaa Xaa Xaa Xaa Xaa Xaa
    1205                1210                1215

Xaa Xaa Xaa Xaa Xaa Xaa Xaa Xaa Xaa Xaa Xaa Xaa Xaa Xaa Xaa
    1220                1225                1230

Xaa Xaa Xaa Xaa Xaa Xaa Xaa Xaa Xaa Xaa Xaa Xaa Xaa Xaa Xaa
    1235                1240                1245

Xaa Xaa Xaa Xaa Xaa Xaa Xaa Xaa Xaa Xaa Xaa Xaa Xaa Xaa Xaa
    1250                1255                1260

Xaa Xaa Xaa Xaa Xaa Xaa Xaa Xaa Xaa Xaa Xaa Xaa Xaa Xaa Xaa
    1265                1270                1275

Xaa Xaa Xaa Xaa Xaa Xaa Xaa Xaa Xaa Xaa Xaa Xaa Xaa Xaa Xaa
    1280                1285                1290

Xaa Xaa Xaa Xaa Xaa Xaa Xaa Xaa Xaa Xaa Xaa Xaa Xaa Xaa Xaa
    1295                1300                1305

Xaa Xaa Xaa Xaa Xaa Xaa Xaa Xaa Xaa Xaa Xaa Xaa Xaa Xaa Xaa
    1310                1315                1320

Xaa Xaa Xaa Xaa Xaa Xaa Xaa Xaa Xaa Xaa Xaa Xaa Xaa Xaa Xaa
    1325                1330                1335

Xaa Xaa Xaa Xaa Xaa Xaa Xaa Xaa Xaa Xaa Xaa Xaa Xaa Xaa Xaa
    1340                1345                1350

Xaa Xaa Xaa Xaa Xaa Xaa Xaa Xaa Xaa Xaa Xaa Xaa Xaa Xaa Xaa
    1355                1360                1365

Xaa Xaa Xaa Xaa Xaa Xaa Xaa Xaa Xaa Xaa Xaa Xaa Xaa Xaa Xaa
    1370                1375                1380

Xaa Xaa Xaa Xaa Xaa Xaa Xaa Xaa Xaa Xaa Xaa Xaa Xaa Xaa Xaa
    1385                1390                1395

Xaa Xaa Xaa Xaa Xaa Xaa Xaa Xaa Xaa Xaa Xaa Xaa Xaa Xaa Xaa
    1400                1405                1410

Xaa Xaa Xaa Xaa Xaa Xaa Xaa Xaa Xaa Xaa Xaa Xaa Xaa Xaa Xaa
    1415                1420                1425

Xaa Xaa Xaa Xaa Xaa Xaa Xaa Xaa Xaa Xaa Xaa Xaa Xaa Xaa Xaa
    1430                1435                1440

Xaa Xaa Xaa Xaa Xaa Xaa Xaa Xaa Xaa Xaa Xaa Xaa Xaa Xaa Xaa
    1445                1450                1455

Xaa Xaa Xaa Xaa Xaa Xaa Xaa Xaa Xaa Xaa Xaa Xaa Xaa Xaa Xaa
    1460                1465                1470

Xaa Xaa Xaa Xaa Xaa Xaa Xaa Xaa Xaa Xaa Xaa Xaa Xaa Xaa Xaa
    1475                1480                1485

Xaa Xaa Xaa Xaa Xaa Xaa Xaa Xaa Xaa Xaa Xaa Xaa Xaa Xaa Xaa
    1490                1495                1500

Xaa Xaa Xaa Xaa Xaa Xaa Xaa Xaa Xaa Xaa Xaa Xaa Xaa Xaa Xaa
    1505                1510                1515

Xaa Xaa Xaa Xaa Xaa Xaa Xaa Xaa Xaa Xaa Xaa Xaa Xaa Xaa Xaa
    1520                1525                1530

Xaa Xaa Xaa Xaa Xaa Xaa Xaa Xaa Xaa Xaa Xaa Xaa Xaa Xaa Xaa
    1535                1540                1545

Xaa Xaa Xaa Xaa Xaa Xaa Xaa Xaa Xaa Xaa Xaa Xaa Xaa Xaa Xaa
    1550                1555                1560

Xaa Xaa Xaa Xaa Xaa Xaa Xaa Xaa Xaa Xaa Xaa Xaa Xaa Xaa Xaa
    1565                1570                1575

Xaa Xaa Xaa Xaa Xaa Xaa Xaa Xaa Xaa Xaa Xaa Xaa Xaa Xaa Xaa
    1580                1585                1590

-continued

Xaa Xaa Xaa Xaa Xaa Xaa Xaa Xaa Xaa Xaa Xaa Xaa Xaa Xaa Xaa
    1595                1600                1605

Xaa Xaa Xaa Xaa Xaa Xaa Xaa Xaa Xaa Xaa Xaa Xaa Xaa Xaa Xaa
    1610                1615                1620

Xaa Xaa Xaa Xaa Xaa Xaa Xaa Xaa Xaa Xaa Xaa Xaa Xaa Xaa Xaa
    1625                1630                1635

Xaa Xaa Xaa Xaa Xaa Xaa Xaa Xaa Xaa Xaa Xaa Xaa Xaa Xaa Xaa
    1640                1645                1650

Xaa Xaa Xaa Xaa Xaa Xaa Xaa Xaa Xaa Xaa Xaa Xaa Xaa Xaa Xaa
    1655                1660                1665

Xaa Xaa Xaa Xaa Xaa Xaa Xaa Xaa Xaa Xaa Xaa Xaa Xaa Xaa Xaa
    1670                1675                1680

Xaa Xaa Xaa Xaa Xaa Xaa Xaa Xaa Xaa Xaa Xaa Xaa Xaa Xaa Xaa
    1685                1690                1695

Xaa Xaa Xaa Xaa Xaa Xaa Xaa Xaa Xaa Xaa Xaa Xaa Xaa Xaa Xaa
    1700                1705                1710

Xaa Xaa Xaa Xaa Xaa Xaa Xaa Xaa Xaa Xaa Xaa Xaa Xaa Xaa Xaa
    1715                1720                1725

Xaa Xaa Xaa Xaa Xaa Xaa Xaa Xaa Xaa Xaa Xaa Xaa Xaa Xaa Xaa
    1730                1735                1740

Xaa Xaa Xaa Xaa Xaa Xaa Xaa Xaa Xaa Xaa Xaa Xaa Xaa Xaa Xaa
    1745                1750                1755

Xaa Xaa Xaa Xaa Xaa Xaa Xaa Xaa Xaa Xaa Xaa Xaa Xaa Xaa Xaa
    1760                1765                1770

Xaa Xaa Xaa Xaa Xaa Xaa Xaa Xaa Xaa Xaa Xaa Xaa Xaa Xaa Xaa
    1775                1780                1785

Xaa Xaa Xaa Xaa Xaa Xaa Xaa Xaa Xaa Xaa Xaa Xaa Xaa Xaa Xaa
    1790                1795                1800

Xaa Xaa Xaa Xaa Xaa Xaa Xaa Xaa Xaa Xaa Xaa Xaa Xaa Xaa Xaa
    1805                1810                1815

Xaa Xaa Xaa Xaa Xaa Xaa Xaa Xaa Xaa Xaa Xaa Xaa Xaa Xaa Xaa
    1820                1825                1830

Xaa Xaa Xaa Xaa Xaa Xaa Xaa Xaa Xaa Xaa Xaa Xaa Xaa Xaa Xaa
    1835                1840                1845

Xaa Xaa Xaa Xaa Xaa Xaa Xaa Xaa Xaa Xaa Xaa Xaa Xaa Xaa Xaa
    1850                1855                1860

Xaa Xaa Xaa Xaa Xaa Xaa Xaa Xaa Xaa Xaa Xaa Xaa Xaa Xaa Xaa
    1865                1870                1875

Xaa Xaa Xaa Xaa Xaa Xaa Xaa Xaa Xaa Xaa Xaa Xaa Xaa Xaa Xaa
    1880                1885                1890

Xaa Xaa Xaa Xaa Xaa Xaa Xaa Xaa Xaa Xaa Xaa Xaa Xaa Xaa Xaa
    1895                1900                1905

Xaa Xaa Xaa Xaa Xaa Xaa Xaa Xaa Xaa Xaa Xaa Xaa Xaa Xaa Xaa
    1910                1915                1920

Xaa Xaa Xaa Xaa Xaa Xaa Xaa Xaa Xaa Xaa Xaa Xaa Xaa Xaa Xaa
    1925                1930                1935

Xaa Xaa Xaa Xaa Xaa Xaa Xaa Xaa Xaa Xaa Xaa Xaa Xaa Xaa Xaa
    1940                1945                1950

Xaa Xaa Xaa Xaa Xaa Xaa Xaa Xaa Xaa Xaa Xaa Xaa Xaa Xaa Xaa
    1955                1960                1965

Xaa Xaa Xaa Xaa Xaa Xaa Xaa Xaa Xaa Xaa Xaa Xaa Xaa Xaa Xaa
    1970                1975                1980

Xaa Xaa  Xaa Xaa Xaa Xaa Xaa  Xaa Xaa Xaa Xaa Xaa  Xaa Xaa Xaa

-continued

```
                         1985                1990                1995

Xaa Xaa Cys Xaa Xaa Xaa Xaa  Xaa Xaa Xaa Xaa Xaa  Xaa Xaa Xaa
        2000            2005                2010

Xaa Xaa Xaa Xaa Xaa Xaa Xaa  Xaa Xaa Xaa Xaa Xaa  Xaa Xaa Xaa
        2015            2020                2025

Xaa Xaa X

-continued

Xaa Xaa Xaa Xaa Xaa Xaa Xaa  Xaa Xaa Xaa Xaa Xaa  Xaa Xaa Xaa
    2390                2395                2400

Xaa Xaa Xaa Xaa Xaa Xaa Xaa  Xaa Xaa Xaa Xaa Xaa  Xaa Xaa Xaa
    2405                2410                2415

Xaa Xaa Xaa Xaa Xaa Xaa Xaa  Xaa Xaa Xaa Xaa Xaa  Xaa Xaa Xaa
    2420                2425                2430

Xaa Xaa Xaa Xaa Xaa Xaa Xaa  Xaa Xaa Xaa Xaa Xaa  Xaa Xaa Xaa
    2435                2440                2445

Xaa Xaa Xaa Xaa Xaa Xaa Xaa  Xaa Xaa Xaa Xaa Xaa  Xaa Xaa Xaa
    2450                2455                2460

Xaa Xaa Xaa Xaa Xaa Xaa Xaa  Xaa Xaa Xaa Xaa Xaa  Xaa Xaa Xaa
    2465                2470                2475

Xaa Xaa Xaa Xaa Xaa Xaa Xaa  Xaa Xaa Xaa Xaa Xaa  Xaa Xaa Xaa
    2480                2485                2490

Xaa Xaa Xaa Xaa Xaa Xaa Xaa  Xaa Xaa Xaa Xaa Xaa  Xaa Xaa Xaa
    2495                2500                2505

Xaa Xaa Xaa Xaa Xaa Xaa Xaa  Xaa Xaa Xaa Xaa Xaa  Xaa Xaa Xaa
    2510                2515                2520

Xaa Xaa Xaa Xaa Xaa Xaa Xaa  Xaa Xaa Xaa Xaa Xaa  Xaa Xaa Xaa
    2525                2530                2535

Xaa Xaa Xaa Xaa Xaa Xaa Xaa  Xaa Xaa Xaa Xaa Xaa  Xaa Xaa Xaa
    2540                2545                2550

Xaa Xaa Xaa Xaa Xaa Xaa Xaa  Xaa Xaa Xaa Xaa Xaa  Xaa Xaa Xaa
    2555                2560                2565

Xaa Xaa Xaa Xaa Xaa Xaa Xaa  Xaa Xaa Xaa Xaa Xaa  Xaa Xaa Xaa
    2570                2575                2580

Xaa Xaa Xaa Xaa Xaa Xaa Xaa  Xaa Xaa Xaa Xaa Xaa  Xaa Xaa Xaa
    2585                2590                2595

Xaa Xaa Xaa Xaa Xaa Xaa Xaa  Xaa Xaa Xaa Xaa Xaa  Xaa Xaa Xaa
    2600                2605                2610

Xaa Xaa Xaa Xaa Xaa Xaa Xaa  Xaa Xaa Xaa Xaa Xaa  Xaa Xaa Xaa
    2615                2620                2625

Xaa Xaa Xaa Xaa Xaa Xaa Xaa  Xaa Xaa Xaa Xaa Xaa  Xaa Xaa Xaa
    2630                2635                2640

Xaa Xaa Xaa Xaa Xaa Xaa Xaa  Xaa Xaa Xaa Xaa Xaa  Xaa Xaa Xaa
    2645                2650                2655

Xaa Xaa Xaa Xaa Xaa Xaa Xaa  Xaa Xaa Xaa Xaa Xaa  Xaa Xaa Xaa
    2660                2665                2670

Xaa Xaa Xaa Xaa Xaa Xaa Xaa  Xaa Xaa Xaa Xaa Xaa  Xaa Xaa Xaa
    2675                2680                2685

Xaa Xaa Xaa Xaa Xaa Xaa Xaa  Xaa Xaa Xaa Xaa Xaa  Xaa Xaa Xaa
    2690                2695                2700

Xaa Xaa Xaa Xaa Xaa Xaa Xaa  Xaa Xaa Xaa Xaa Xaa  Xaa Xaa Xaa
    2705                2710                2715

Xaa Xaa Xaa Xaa Xaa Xaa Xaa  Xaa Xaa Xaa Xaa Xaa  Xaa Xaa Xaa
    2720                2725                2730

Xaa Xaa Xaa Xaa Xaa Xaa Xaa  Xaa Xaa Xaa Xaa Xaa  Xaa Xaa Xaa
    2735                2740                2745

Xaa Xaa Xaa Xaa Xaa Xaa Xaa  Xaa Xaa Xaa Xaa Xaa  Xaa Xaa Xaa
    2750                2755                2760

Xaa Xaa Xaa Xaa Xaa Xaa Xaa  Xaa Xaa Xaa Xaa Xaa  Xaa Xaa Xaa
    2765                2770                2775

Xaa Xaa Xaa Xaa Xaa Xaa Xaa  Xaa Xaa Xaa Xaa Xaa  Xaa Xaa Xaa
    2780                2785                2790

-continued

Xaa Xaa Xaa Xaa Xaa Xaa Xaa  Xaa Xaa Xaa Xaa Xaa  Xaa Xaa Xaa
        2795                2800                2805

Xaa Xaa Xaa Xaa Xaa Xaa Xaa  Xaa Xaa Xaa Xaa Xaa  Xaa Xaa Xaa
        2810                2815                2820

Xaa Xaa Xaa Xaa Xaa Xaa Xaa  Xaa Xaa Xaa Xaa Xaa  Xaa Xaa Xaa
        2825                2830                2835

Xaa Xaa Xaa Xaa Xaa Xaa Xaa  Xaa Xaa Xaa Xaa Xaa  Xaa Xaa Xaa
        2840                2845                2850

Xaa Xaa Xaa Xaa Xaa Xaa Xaa  Xaa Xaa Xaa Xaa Xaa  Xaa Xaa Xaa
        2855                2860                2865

Xaa Xaa Xaa Xaa Xaa Xaa Xaa  Xaa Xaa Xaa Xaa Xaa  Xaa Xaa Xaa
        2870                2875                2880

Xaa Xaa Xaa Xaa Xaa Xaa Xaa  Xaa Xaa Xaa Xaa Xaa  Xaa Xaa Xaa
        2885                2890                2895

Xaa Xaa Xaa Xaa Xaa Xaa Xaa  Xaa Xaa Xaa Xaa Xaa  Xaa Xaa Xaa
        2900                2905                2910

Xaa Xaa Xaa Xaa Xaa Xaa Xaa  Xaa Xaa Xaa Xaa Xaa  Xaa Xaa Xaa
        2915                2920                2925

Xaa Xaa Xaa Xaa Xaa Xaa Xaa  Xaa Xaa Xaa Xaa Xaa  Xaa Xaa Xaa
        2930                2935                2940

Xaa Xaa Xaa Xaa Xaa Xaa Xaa  Xaa Xaa Xaa Xaa Xaa  Xaa Xaa Xaa
        2945                2950                2955

Xaa Xaa Xaa Xaa Xaa Xaa Xaa  Xaa Xaa Xaa Xaa Xaa  Xaa Xaa Xaa
        2960                2965                2970

Xaa Xaa Xaa Xaa Xaa Xaa Xaa  Xaa Xaa Xaa Xaa Xaa  Xaa Xaa Xaa
        2975                2980                2985

Xaa Xaa Xaa Xaa Xaa Xaa Xaa  Xaa Xaa Xaa Xaa Xaa  Xaa Xaa Xaa
        2990                2995                3000

Xaa Xaa Xaa Xaa Xaa Xaa Xaa  Xaa Xaa Xaa Xaa Xaa  Xaa Xaa Xaa
        3005                3010                3015

Xaa Xaa Xaa Xaa Xaa Xaa Xaa  Xaa Xaa Xaa Xaa Xaa  Xaa Xaa Xaa
        3020                3025                3030

Xaa Xaa Xaa Xaa Xaa Xaa Xaa  Xaa Xaa Xaa Xaa Xaa  Xaa Xaa Xaa
        3035                3040                3045

Xaa Xaa Xaa Xaa Xaa Xaa Xaa  Xaa Xaa Xaa Xaa Xaa  Xaa Xaa Xaa
        3050                3055                3060

Xaa Xaa Xaa Xaa Xaa Xaa Xaa  Xaa Xaa Xaa Xaa Xaa  Xaa Xaa Xaa
        3065                3070                3075

Xaa Xaa Xaa Xaa Xaa Xaa Xaa  Xaa Xaa Xaa Xaa Xaa  Xaa Xaa Xaa
        3080                3085                3090

Xaa Xaa Xaa Xaa Xaa Xaa Xaa  Xaa Xaa Xaa Xaa Xaa  Xaa Xaa Xaa
        3095                3100                3105

Xaa Xaa Xaa Xaa Xaa Xaa Xaa  Xaa Xaa Xaa Xaa Xaa  Xaa Xaa Xaa
        3110                3115                3120

Xaa Xaa Xaa Xaa Xaa Xaa Xaa  Xaa Xaa Xaa Xaa Xaa  Xaa Xaa Xaa
        3125                3130                3135

Xaa Xaa Xaa Xaa Xaa Xaa Xaa  Xaa Xaa Xaa Xaa Xaa  Xaa Xaa Xaa
        3140                3145                3150

Xaa Xaa Xaa Xaa Xaa Xaa Xaa  Xaa Xaa Xaa Xaa Xaa  Xaa Xaa Xaa
        3155                3160                3165

Xaa Xaa Xaa Xaa Xaa Xaa Xaa  Xaa Xaa Xaa Xaa Xaa  Xaa Xaa Xaa
        3170                3175                3180

Xaa Xaa  Xaa Xaa Xaa Xaa Xaa  Xaa Xaa Xaa Xaa Xaa  Xaa Xaa Xaa

-continued

```
                    3185                3190                3195

Xaa Xaa Xaa Xaa Xaa Xaa Xaa  Xaa Xaa Xaa Xaa Xaa  Xaa Xaa Xaa
    3200                3205                3210

Xaa Xaa Xaa Xaa Xaa Xaa Xaa  Xaa Xaa Xaa Xaa Xaa  Xaa Xaa Xaa
    3215                3220                3225

Xaa Xaa Xaa Xaa Xaa Xaa Xaa  Xaa Xaa Xaa Xaa Xaa  Xaa Xaa Xaa
    3230                3235                3240

Xaa Xaa Xaa Xaa Xaa Xaa Xaa  Xaa Xaa Xaa Xaa Xaa  Xaa Xaa Xaa
    3245                3250                3255

Xaa Xaa Xaa Xaa Xaa Xaa Xaa  Xaa Xaa Xaa Xaa Xaa  Xaa Xaa Xaa
    3260                3265                3270

Xaa Xaa Xaa Xaa Xaa Xaa Xaa  Xaa Xaa Xaa Xaa Xaa  Xaa Xaa Xaa
    3275                3280                3285

Xaa Xaa Xaa Xaa Xaa Xaa Xaa  Xaa Xaa Xaa Xaa Xaa  Xaa Xaa Xaa
    3290                3295                3300

Xaa Xaa Xaa Xaa Xaa Xaa Xaa  Xaa Xaa Xaa Xaa Xaa  Xaa Xaa Xaa
    3305                3310                3315

Xaa Xaa Xaa Xaa Xaa Xaa Xaa  Xaa Xaa Xaa Xaa Xaa  Xaa Xaa Xaa
    3320                3325                3330

Xaa Xaa Xaa Xaa Xaa Xaa Xaa  Xaa Xaa Xaa Xaa Xaa  Xaa Xaa Xaa
    3335                3340                3345

Xaa Xaa Xaa Xaa Xaa Xaa Xaa  Xaa Xaa Xaa Xaa Xaa  Xaa Xaa Xaa
    3350                3355                3360

Xaa Xaa Xaa Xaa Xaa Xaa Xaa  Xaa Xaa Xaa Xaa Xaa  Xaa Xaa Xaa
    3365                3370                3375

Xaa Xaa Xaa Xaa Xaa Xaa Xaa  Xaa Xaa Xaa Xaa Xaa  Xaa Xaa Xaa
    3380                3385                3390

Xaa Xaa Xaa Xaa Xaa Xaa Xaa  Xaa Xaa Xaa Xaa Xaa  Xaa Xaa Xaa
    3395                3400                3405

Xaa Xaa Xaa Xaa Xaa Xaa Xaa  Xaa Xaa Xaa Xaa Xaa  Xaa Xaa Xaa
    3410                3415                3420

Xaa Xaa Xaa Xaa Xaa Xaa Xaa  Xaa Xaa Xaa Xaa Xaa  Xaa Xaa Xaa
    3425                3430                3435

Xaa Xaa Xaa Xaa Xaa Xaa Xaa  Xaa Xaa Xaa Xaa Xaa  Xaa Xaa Xaa
    3440                3445                3450

Xaa Xaa Xaa Xaa Xaa Xaa Xaa  Xaa Xaa Xaa Xaa Xaa  Xaa Xaa Xaa
    3455                3460                3465

Xaa Xaa Xaa Xaa Xaa Xaa Xaa  Xaa Xaa Xaa Xaa Xaa  Xaa Xaa Xaa
    3470                3475                3480

Xaa Xaa Xaa Xaa Xaa Xaa Xaa  Xaa Xaa Xaa Xaa Xaa  Xaa Xaa Xaa
    3485                3490                3495

Xaa Xaa Xaa Xaa Xaa Xaa Xaa  Xaa Xaa Xaa Xaa Xaa  Xaa Xaa Xaa
    3500                3505                3510

Xaa Xaa Xaa Xaa Xaa Xaa Xaa  Xaa Xaa Xaa Xaa Xaa  Xaa Xaa Xaa
    3515                3520                3525

Xaa Xaa Xaa Xaa Xaa Xaa Xaa  Xaa Xaa Xaa Xaa Xaa  Xaa Xaa Xaa
    3530                3535                3540

Xaa Xaa Xaa Xaa Xaa Xaa Xaa  Xaa Xaa Xaa Xaa Xaa  Xaa Xaa Xaa
    3545                3550                3555

Xaa Xaa Xaa Xaa Xaa Xaa Xaa  Xaa Xaa Xaa Xaa Xaa  Xaa Xaa Xaa
    3560                3565                3570

Xaa Xaa Xaa Xaa Xaa Xaa Xaa  Xaa Xaa Xaa Xaa Xaa  Xaa Xaa Xaa
    3575                3580                3585
```

Xaa Xaa Xaa Xaa Xaa Xaa Xaa Xaa Xaa Xaa Xaa Xaa Xaa Xaa Xaa
     3590                3595                3600

Xaa Xaa Xaa Xaa Xaa Xaa Xaa Xaa Xaa Xaa Xaa Xaa Xaa Xaa Xaa
     3605                3610                3615

Xaa Xaa Xaa Xaa Xaa Xaa Xaa Xaa Xaa Xaa Xaa Xaa Xaa Xaa Xaa
     3620                3625                3630

Xaa Xaa Xaa Xaa Xaa Xaa Xaa Xaa Xaa Xaa Xaa Xaa Xaa Xaa Xaa
     3635                3640                3645

Xaa Xaa Xaa Xaa Xaa Xaa Xaa Xaa Xaa Xaa Xaa Xaa Xaa Xaa Xaa
     3650                3655                3660

Xaa Xaa Xaa Xaa Xaa Xaa Xaa Xaa Xaa Xaa Xaa Xaa Xaa Xaa Xaa
     3665                3670                3675

Xaa Xaa Xaa Xaa Xaa Xaa Xaa Xaa Xaa Xaa Xaa Xaa Xaa Xaa Xaa
     3680                3685                3690

Xaa Xaa Xaa Xaa Xaa Xaa Xaa Xaa Xaa Xaa Xaa Xaa Xaa Xaa Xaa
     3695                3700                3705

Xaa Xaa Xaa Xaa Xaa Xaa Xaa Xaa Xaa Xaa Xaa Xaa Xaa Xaa Xaa
     3710                3715                3720

Xaa Xaa Xaa Xaa Xaa Xaa Xaa Xaa Xaa Xaa Xaa Xaa Xaa Xaa Xaa
     3725                3730                3735

Xaa Xaa Xaa Xaa Xaa Xaa Xaa Xaa Xaa Xaa Xaa Xaa Xaa Xaa Xaa
     3740                3745                3750

Xaa Xaa Xaa Xaa Xaa Xaa Xaa Xaa Xaa Xaa Xaa Xaa Xaa Xaa Xaa
     3755                3760                3765

Xaa Xaa Xaa Xaa Xaa Xaa Xaa Xaa Xaa Xaa Xaa Xaa Xaa Xaa Xaa
     3770                3775                3780

Xaa Xaa Xaa Xaa Xaa Xaa Xaa Xaa Xaa Xaa Xaa Xaa Xaa Xaa Xaa
     3785                3790                3795

Xaa Xaa Xaa Xaa Xaa Xaa Xaa Xaa Xaa Xaa Xaa Xaa Xaa Xaa Xaa
     3800                3805                3810

Xaa Xaa Xaa Xaa Xaa Xaa Xaa Xaa Xaa Xaa Xaa Xaa Xaa Xaa Xaa
     3815                3820                3825

Xaa Xaa Xaa Xaa Xaa Xaa Xaa Xaa Xaa Xaa Xaa Xaa Xaa Xaa Xaa
     3830                3835                3840

Xaa Xaa Xaa Xaa Xaa Xaa Xaa Xaa Xaa Xaa Xaa Xaa Xaa Xaa Xaa
     3845                3850                3855

Xaa Xaa Xaa Xaa Xaa Xaa Xaa Xaa Xaa Xaa Xaa Xaa Xaa Xaa Xaa
     3860                3865                3870

Xaa Xaa Xaa Xaa Xaa Xaa Xaa Xaa Xaa Xaa Xaa Xaa Xaa Xaa Xaa
     3875                3880                3885

Xaa Xaa Xaa Xaa Xaa Xaa Xaa Xaa Xaa Xaa Xaa Xaa Xaa Xaa Xaa
     3890                3895                3900

Xaa Xaa Xaa Xaa Xaa Xaa Xaa Xaa Xaa Xaa Xaa Xaa Xaa Xaa Xaa
     3905                3910                3915

Xaa Xaa Xaa Xaa Xaa Xaa Xaa Xaa Xaa Xaa Xaa Xaa Xaa Xaa Xaa
     3920                3925                3930

Xaa Xaa Xaa Xaa Xaa Xaa Xaa Xaa Xaa Xaa Xaa Xaa Xaa Xaa Xaa
     3935                3940                3945

Xaa Xaa Xaa Xaa Xaa Xaa Xaa Xaa Xaa Xaa Xaa Xaa Xaa Xaa Xaa
     3950                3955                3960

Xaa Xaa Xaa Xaa Xaa Xaa Xaa Xaa Xaa Xaa Xaa Xaa Xaa Xaa Xaa
     3965                3970                3975

Xaa Xaa Xaa Xaa Xaa Xaa Xaa Xaa Xaa Xaa Xaa Xaa Xaa Xaa Xaa
     3980                3985                3990

Xaa Xaa Xaa Xaa Xaa Xaa Xaa  Xaa Xaa Xaa Xaa Xaa  Xaa Xaa Xaa
    3995                4000                 4005

Xaa Xaa Xaa Xaa Xaa Xaa Xaa  Xaa Xaa Xaa Xaa Xaa  Xaa Xaa Xaa
    4010                4015                 4020

Xaa Xaa Xaa Xaa Xaa Xaa Xaa  Xaa Xaa Xaa Xaa Xaa  Xaa Xaa Xaa
    4025                4030                 4035

Xaa Xaa Xaa Xaa Xaa Xaa Xaa  Xaa Xaa Xaa Xaa Xaa  Xaa Xaa Xaa
    4040                4045                 4050

Xaa Xaa Xaa Xaa Xaa Xaa Xaa  Xaa Xaa Xaa Xaa Xaa  Xaa Xaa Xaa
    4055                4060                 4065

Xaa Xaa Xaa Xaa Xaa Xaa Xaa  Xaa Xaa Xaa Xaa Xaa  Xaa Xaa Xaa
    4070                4075                 4080

Xaa Xaa Xaa Xaa Xaa Xaa Xaa  Xaa Xaa Xaa Xaa Xaa  Xaa Xaa Xaa
    4085                4090                 4095

Xaa Xaa Xaa Xaa Xaa Xaa Xaa  Xaa Xaa Xaa Xaa Xaa  Xaa Xaa Xaa
    4100                4105                 4110

Xaa Xaa Xaa Xaa Xaa Xaa Xaa  Xaa Xaa Xaa Xaa Xaa  Xaa Xaa Xaa
    4115                4120                 4125

Xaa Xaa Xaa Xaa Xaa Xaa Xaa  Xaa Xaa Xaa Xaa Xaa  Xaa Xaa Xaa
    4130                4135                 4140

Xaa Xaa Xaa Xaa Xaa Xaa Xaa  Xaa Xaa Xaa Xaa Xaa  Xaa Xaa Xaa
    4145                4150                 4155

Xaa Xaa Xaa Xaa Xaa Xaa Xaa  Xaa Xaa Xaa Xaa Xaa  Xaa Xaa Xaa
    4160                4165                 4170

Xaa Xaa Xaa Xaa Xaa Xaa Xaa  Xaa Xaa Xaa Xaa Xaa  Xaa Xaa Xaa
    4175                4180                 4185

Xaa Xaa Xaa Xaa Xaa Xaa Xaa  Xaa Xaa Xaa Xaa Xaa  Xaa Xaa Xaa
    4190                4195                 4200

Xaa Xaa Xaa Xaa Xaa Xaa Xaa  Xaa Xaa Xaa Xaa Xaa  Xaa Xaa Xaa
    4205                4210                 4215

Xaa Xaa Xaa Xaa Xaa Xaa Xaa  Xaa Xaa Xaa Xaa Xaa  Xaa Xaa Xaa
    4220                4225                 4230

Xaa Xaa Xaa Xaa Xaa Xaa Xaa  Xaa Xaa Xaa Xaa Xaa  Xaa Xaa Xaa
    4235                4240                 4245

Xaa Xaa Xaa Xaa Xaa Xaa Xaa  Xaa Xaa Xaa Xaa Xaa  Xaa Xaa Xaa
    4250                4255                 4260

Xaa Xaa Xaa Xaa Xaa Xaa Xaa  Xaa Xaa Xaa Xaa Xaa  Xaa Xaa Xaa
    4265                4270                 4275

Xaa Xaa Xaa Xaa Xaa Xaa Xaa  Xaa Xaa Xaa Xaa Xaa  Xaa Xaa Xaa
    4280                4285                 4290

Xaa Xaa Xaa Xaa Xaa Xaa Xaa  Xaa Xaa Xaa Xaa Xaa  Xaa Xaa Xaa
    4295                4300                 4305

Xaa Xaa Xaa Xaa Xaa Xaa Xaa  Xaa Xaa Xaa Xaa Xaa  Xaa Xaa Xaa
    4310                4315                 4320

Xaa Xaa Xaa Xaa Xaa Xaa Xaa  Xaa Xaa Xaa Xaa Xaa  Xaa Xaa Xaa
    4325                4330                 4335

Xaa Xaa Xaa Xaa Xaa Xaa Xaa  Xaa Xaa Xaa Xaa Xaa  Xaa Xaa Xaa
    4340                4345                 4350

Xaa Xaa Xaa Xaa Xaa Xaa Xaa  Xaa Xaa Xaa Xaa Xaa  Xaa Xaa
    4355                4360                 4365

AERATED FOOD PRODUCTS

FIELD OF THE INVENTION

The present invention relates to aerated food products that include hydrophobins.

BACKGROUND TO THE INVENTION

A wide variety of food products contain introduced gas, such as air, nitrogen and/or carbon dioxide. Such foods include frozen and chilled food products, for example ice cream and mousses. Two key considerations arise in the production and storage of aerated food products, namely the ability to incorporate gas into the product during manufacture (foamability) and the subsequent stability of the gas bubbles during storage (foam stability). A number of additives are included in aerated food products to assist in the creation and maintenance of foam. These include proteins such as sodium caseinate and whey, which are highly foamable, and biopolymers, such as carrageenans, guar gum, locust bean gum, pectins, alginates, xanthan, gellan, gelatin and mixtures thereof, which are good stabilisers. However, although stabilisers used in the art can often maintain the total foam volume, they are poor at inhibiting the coarsening of the foam microstructure, i.e. increase in gas bubble size by processes such as disproportionation and coalescence. Further, many of the ingredients used to stabilise the gas phase in aerated food products need to be added at fairly high levels which can have deleterious textural and/or calorific consequences.

SUMMARY OF THE INVENTION

We have found that a class of proteins found in fungi, termed hydrophobins, combine high foamability and good foam stabilisation properties. In particular, hydrophobins have been found to provide both excellent foam volume stability and inhibition of coarsening. Further, the levels of hydrophobin required to achieve excellent product stability are relatively low. It will therefore be possible to replace some or all of the conventional ingredients used to form and stabilise aerated food products with smaller amounts of hydrophobin.

Accordingly, the present invention provides an aerated food product comprising a hydrophobin. In a related aspect, the present invention provides an aerated food product in which the air phase is at least partially stabilised with hydrophobin. In another related aspect, the present invention provides an aerated food product comprising hydrophobin in which the hydrophobin is associated with the air phase.

Preferably the hydrophobin is a class II hydrophobin.

In a preferred embodiment, the hydrophobin is present in an amount of at least 0.001 wt %, more preferably at least 0.01 wt %.

In a related aspect, the present invention provides a composition for producing an aerated food product of the invention, which composition comprises hydrophobin, preferably hydrophobin in isolated form, together with at least one of the remaining ingredients of the food product. Preferably the composition comprises all the remaining ingredients of the food product.

In a related embodiment, the present invention provides a dry composition for producing an aerated food product of the invention, which composition comprises hydrophobin, preferably hydrophobin in isolated form, together with at least one of the remaining non-liquid ingredients of the food product. Preferably the composition comprises all the remaining non-liquid ingredients of the food product.

The present invention further provides the use of a hydrophobin in a method of inhibiting bubble coarsening in an aerated food product.

In a related aspect the present invention provides a method of inhibiting bubble coarsening in an aerated food product which method comprises adding hydrophobin to the food product prior to and/or during aeration of the product.

The present invention also provides the use of a hydrophobin in a method of stabilising a foam in an aerated food product.

In a related aspect the present invention also provides a method of stabilising a foam in an aerated food product which method comprises adding hydrophobin to the food product prior to and/or during aeration of the product.

The present invention further provides the use of a hydrophobin in a method of improving shape retention and/or rigidity in an aerated food product.

In a related aspect the present invention provides a method of improving shape retention and/or rigidity in an aerated food product which method comprises adding hydrophobin to the food product prior to and/or during aeration of the product.

DETAILED DESCRIPTION OF THE INVENTION

Unless defined otherwise, all technical and scientific terms used herein have the same meaning as commonly understood by one of ordinary skill in the art (e.g. in chilled confectionery/frozen confectionery manufacture, chemistry and biotechnology). Definitions and descriptions of various terms and techniques used in chilled/frozen confectionery manufacture are found in Ice Cream, 4th Edition, Arbuckle (1986), Van Nostrand Reinhold Company, New York, N.Y. Standard techniques used for molecular and biochemical methods can be found in Sambrook et al., Molecular Cloning: A Laboratory Manual, 3rd ed. (2001) Cold Spring Harbor Laboratory Press, Cold Spring Harbor, N.Y. and Ausubel et al., Short Protocols in Molecular Biology (1999) 4th Ed, John Wiley & Sons, Inc.—and the full version entitled Current Protocols in Molecular Biology).

Hydrophobins

Hydrophobins are a well-defined class of proteins (Wessels, 1997, Adv. Microb. Physio. 38: 1-45; Wosten, 2001, Annu Rev. Microbiol. 55: 625-646) capable of self-assembly at a hydrophobic/hydrophilic interface, and having a conserved sequence:

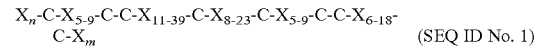

(SEQ ID No. 1)

where X represents any amino acid, and n and m independently represent an integer. Typically, a hydrophobin has a length of up to 125 amino acids. The cysteine residues (C) in the conserved sequence are part of disulphide bridges. In the context of the present invention, the term hydrophobin has a wider meaning to include functionally equivalent proteins still displaying the characteristic of self-assembly at a hydrophobic-hydrophilic interface resulting in a protein film, such as proteins comprising the sequence:

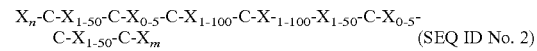

(SEQ ID No. 2)

or parts thereof still displaying the characteristic of self-assembly at a hydrophobic-hydrophilic interface resulting in a protein film. In accordance with the definition of the present invention, self-assembly can be detected by adsorbing the protein to Teflon and using Circular Dichroism to establish the presence of a secondary structure (in general, α-helix) (De Vocht et al., 1998, Biophys. J. 74: 2059-68).

The formation of a film can be established by incubating a Teflon sheet in the protein solution followed by at least three washes with water or buffer (Wosten et al., 1994, Embo. J. 13: 5848-54). The protein film can be visualised by any suitable method, such as labeling with a fluorescent marker or by the use of fluorescent antibodies, as is well established in the art. m and n typically have values ranging from 0 to 2000, but more usually m and n in total are less than 100 or 200. The definition of hydrophobin in the context of the present invention includes fusion proteins of a hydrophobin and another polypeptide as well as conjugates of hydrophobin and other molecules such as polysaccharides.

Hydrophobins identified to date are generally classed as either class I or class II. Both types have been identified in fungi as secreted proteins that self-assemble at hydrophobic interfaces into amphipathic films. Assemblages of class I hydrophobins are relatively insoluble whereas those of class II hydrophobins readily dissolve in a variety of solvents.

Hydrophobin-like proteins have also been identified in filamentous bacteria, such as *Actinomycete* and *Steptomyces* sp. (WO01/74864). These bacterial proteins, by contrast to fungal hydrophobins, form only up to one disulphide bridge since they have only two cysteine residues. Such proteins are an example of functional equivalents to hydrophobins having the consensus sequences shown in SEQ ID Nos. 1 and 2, and are within the scope of the present invention.

The hydrophobins can be obtained by extraction from native sources, such as filamentous fungi, by any suitable process. For example, hydrophobins can be obtained by culturing filamentous fungi that secrete the hydrophobin into the growth medium or by extraction from fungal mycelia with 60% ethanol. It is particularly preferred to isolate hydrophobins from host organisms that naturally secrete hydrophobins. Preferred hosts are hyphomycetes (e.g. *Trichoderma*), basidiomycetes and ascomycetes. Particularly preferred hosts are food grade organisms, such as *Cryphonectria parasitica* which secretes a hydrophobin termed cryparin (MacCabe and Van Alfen, 1999, App. Environ. Microbiol 65: 5431-5435).

Alternatively, hydrophobins can be obtained by the use of recombinant technology. For example host cells, typically micro-organisms, may be modified to express hydrophobins and the hydrophobins can then be isolated and used in accordance with the present invention. Techniques for introducing nucleic acid constructs encoding hydrophobins into host cells are well known in the art. More than 34 genes coding for hydrophobins have been cloned, from over 16 fungal species (see for example WO96/41882 which gives the sequence of hydrophobins identified in *Agaricus bisporus*; and Wosten, 2001, Annu Rev. Microbiol. 55: 625-646). Recombinant technology can also be used to modify hydrophobin sequences or synthesise novel hydrophobins having desired/improved properties.

Typically, an appropriate host cell or organism is transformed by a nucleic acid construct that encodes the desired hydrophobin. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species, include yeasts such as (but not limited to) those of the genera *Saccharomyces, Kluyveromyces, Pichia, Hansenula, Candida, Schizo saccharomyces* and the like, and filamentous species such as (but not limited to) those of the genera *Aspergillus, Trichoderma, Mucor, Neurospora, Fusarium* and the like.

The sequences encoding the hydrophobins are preferably at least 80% identical at the amino acid level to a hydrophobin identified in nature, more preferably at least 95% or 100% identical. However, persons skilled in the art may make conservative substitutions or other amino acid changes that do not reduce the biological activity of the hydrophobin. For the purpose of the invention these hydrophobins possessing this high level of identity to a hydrophobin that naturally occurs are also embraced within the term "hydrophobins".

Hydrophobins can be purified from culture media or cellular extracts by, for example, the procedure described in WO01/57076 which involves adsorbing the hydrophobin present in a hydrophobin-containing solution to surface and then contacting the surface with a surfactant, such as Tween 20, to elute the hydrophobin from the surface. See also Collen et al., 2002, Biochim Biophys Acta. 1569: 139-50; Calonje et al., 2002, Can. J. Microbiol. 48: 1030-4; Askolin et al., 2001, Appl Microbiol Biotechnol. 57: 124-30; and De Vries et al., 1999, Eur J Biochem. 262: 377-85.

Aerated Food Products

Aerated food products of the invention typically fall into one of four groups—hot, ambient, chilled or frozen. The term "food" includes beverages. Hot food products include beverages such as cappuccino coffee. Ambient aerated food products include whipped cream, marshmallows and bakery products, e.g. bread. Chilled aerated food products include whipped cream, mousses and beverages such as beer, milk shakes and smoothies. Frozen aerated food products include frozen confections such as ice cream, milk ice, frozen yoghurt, sherbet, slushes, frozen custard, water ice, sorbet, granitas and frozen purees.

Preferably the aerated food product is an aerated confectionery product.

The term "aerated" means that gas has been intentionally incorporated into the product, such as by mechanical means. The gas can be any food-grade gas such as air, nitrogen or carbon dioxide. The extent of aeration is typically defined in terms of "overrun". In the context of the present invention, % overrun is defined in volume terms as:

$$((\text{volume of the final aerated product} - \text{volume of the mix})/\text{volume of the mix}) \times 100$$

The amount of overrun present in the product will vary depending on the desired product characteristics. For example, the level of overrun in ice cream is typically from about 70 to 100%, and in confectionery such as mousses the overrun can be as high as 200 to 250 wt %, whereas the overrun in water ices is from 25 to 30%. The level of overrun in some chilled products, ambient products and hot products can be lower, but generally over 10%, e.g. the level of overrun in milkshakes is typically from 10 to 40 wt %.

The amount of hydrophobin present in the product will generally vary depending on the product formulation and volume of the air phase. Typically, the product will contain at least 0.001 wt %, hydrophobin, more preferably at least 0.005 or 0.01 wt %. Typically the product will contain less than 1 wt % hydrophobin. The hydrophobin may be from a single source or a plurality of sources e.g. the hydrophobin can a mixture of two or more different hydrophobin polypeptides.

Preferably the hydrophobin is a class II hydrophobin.

The present invention also encompasses compositions for producing an aerated food product of the invention, which composition comprises a hydrophobin. Such compositions include liquid premixes, for example premixes used in the production of frozen confectionery products, and dry mixes, for example powders, to which an aqueous liquid, such as milk or water, is added prior to or during aeration.

Such compositions include liquid premixes, for example premixes used in the production of frozen confectionery products, and dry mixes, for example powders, to which an aqueous liquid, such as milk or water, is added prior to or during aeration.

The compositions for producing a frozen food product of the invention, will comprise other ingredients, in addition to the hydrophobin, which are normally included in the food product, e.g. sugar, fat, emulsifiers, flavourings etc. The compositions may include all of the remaining ingredients required to make the food product such that the composition is ready to be processed, i.e. aerated, to form an aerated food product of the invention.

Dry compositions for producing an aerated food product of the invention will also comprise other ingredients, in addition to the hydrophobin, which are normally included in the food product, e.g. sugar, fat, emulsifiers, flavourings etc. The compositions may include all of the remaining non-liquid ingredients required to make the food product such that all that the user need only add an aqueous liquid, such as water or milk, and the composition is ready to be processed to form an aerated food product of the invention. These dry compositions, examples of which include powders and granules, can be designed for both industrial and retail use, and benefit from reduced bulk and longer shelf life.

The hydrophobin is added in a form and in an amount such that it is available to stabilise the air phase. By the term "added", we mean that the hydrophobin is deliberately introduced into the food product for the purpose of taking advantage of its foam stabilising properties. Consequently, where food ingredients are present or added that contain fungal contaminants, which may contain hydrophobin polypeptides, this does not constitute adding hydrophobin within the context of the present invention.

Typically, the hydrophobin is added to the food product in a form such it is capable of self-assembly at an air-liquid surface.

Typically, the hydrophobin is added to the food product or compositions of the invention in an isolated form, typically at least partially purified, such as at least 10% pure, based on weight of solids. By "added in isolated form", we mean that the hydrophobin is not added as part of a naturally-occurring organism, such as a mushroom, which naturally expresses hydrophobins. Instead, the hydrophobin will typically either have been extracted from a naturally-occurring source or obtained by recombinant expression in a host organism.

In one embodiment, the hydrophobin is added to the food product in monomeric, dimeric and/or oligomeric (i.e. consisting of 10 monomeric units or fewer) form. Preferably at least 50 wt % of the added hydrophobin is in at least one of these forms, more preferably at least 75, 80, 85 or 90 wt %. Once added, the hydrophobin will typically undergo assembly at the air/liquid interface and therefore the amount of monomer, dimer and oligomer would be expected to decrease.

In one embodiment, the hydrophobin is added to the aerated food product or compositions of the invention in an isolated form, typically at least partially purified.

The added hydrophobin can be used to stabilise the air phase in an aerated food product, generally by inhibiting bubble coarsening, i.e. hydrophobins have been found not only to stabilise foam volume but also the size of the bubbles within the foam.

The present invention will now be described further with reference to the following examples which are illustrative only and non-limiting.

EXAMPLE 1

Foamability (a) Sodium Caseinate, Skimmed Milk Protein or Hydrophobin in Water The foamability of *Trichoderma reesei* hydrophobin II (HFB II) was compared to that of the widely used, foamable, dairy protein sodium caseinate (DMV International, the Netherlands. 88-90% protein, 1.5% fat and 6% moisture) and skimmed milk (United Milk, UK. 33-36% protein, 0.8% fat, 3.7% moisture). HFBII was obtained from VTT Biotechnology, Finland (purified from *Trichoderma reesei* essentially as described in WO00/58342 and Linder et al., 2001, Biomacromolecules 2: 511-517).

The table below shows the concentrations of the protein solutions that were prepared.

TABLE 1

Solutions prepared

| Protein source | Concentration wt % | Shear time (seconds) |
|---|---|---|
| HFB II ex *T. Reesei* | 0.05 | 600 |
| HFB II ex *T. Reesei* | 0.08 | 600 |
| HFB II ex *T. Reesei* | 0.1 | 600 |
| Sodium caseinate | 0.1 | 600 |
| Sodium caseinate | 0.5 | 300 |
| Sodium caseinate | 1 | 120 |
| Sodium caseinate | 2 | 60 |
| SMP | 0.29 | 600 |
| SMP | 1.43 | 345 |
| SMP | 2.86 | 165 |
| SMP | 5.71 | 60 |

The dairy protein solutions were prepared using a magnetic stirrer and the protein was sprinkled into the water at room temperature. The solution was then heated to 60° C., held for 5 minutes and then cooled to 5° C. The HFB II solutions were prepared by using a Sonicor ultrasonic bath model SC-42 (Sonicor Instrument Corp). The HFB II was added either as an aliquot or dry powder which was sonicated for between 30 seconds to 1 minute at room temperature until all of the HFB was dispersed and a clear liquid obtained. This solution was also cooled to 5° C. before aeration.

Foams were produced by shearing each solution for up to a maximum of 10 minutes in a cooled (2° C.) cylindrical, vertically mounted, jacketed stainless steel vessel with internal proportions of 105 mm height and diameter 72 mm. The lid of the vessel fills 54% of the internal volume leaving 46% (180 ml) for the sample. The rotor used to shear the sample consists of a rectangular impeller of the correct proportions to scrape the surface edge of the container as it rotates (dimensions 72 mm×41.5 mm). Also attached to the rotor are two semicircular (60 mm diameter) high-shear blades positioned at a 45° angle to the rectangular attachment.

80 ml of solution was poured into the vessel, enough to cover half the rotor, and the lid secured. The solution was then sheared at 1250 rpm for the aforementioned period (table 1). The aerated solution was then immediately poured into a measuring cylinder, thus giving a measure of overrun by volume. Foamability refers to the volume of foam is stated in terms of percentage "overrun", and based on the definition by Arbuckle (ibid).

Overrun %=100×(volume of foam−volume of unaerated solution)/(volume unaerated solution)

Figure 1:
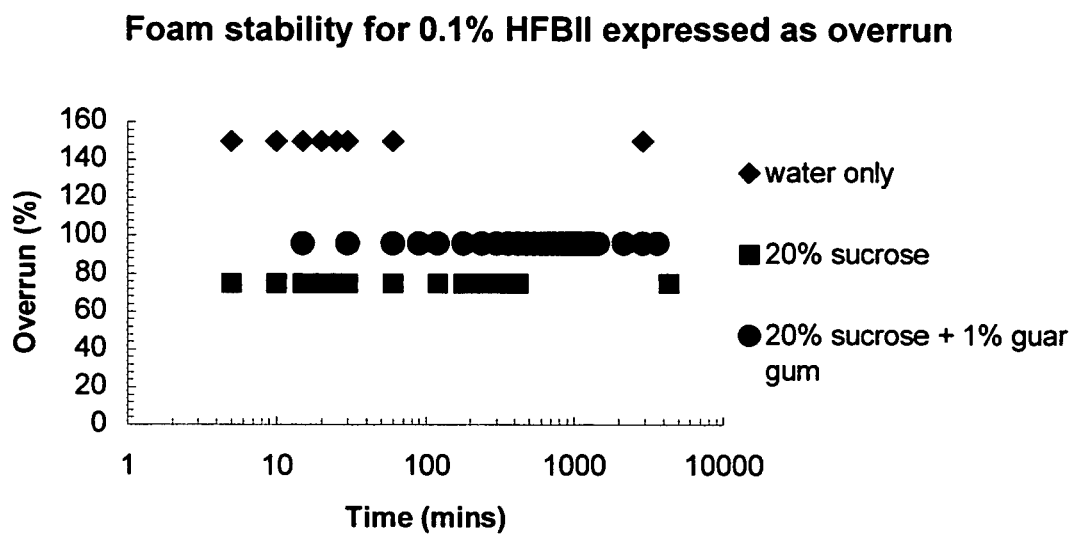
FIG. 1 is a graph showing overrun as a function of protein concentration of hydrophobin, sodium caseinate and skimmed milk powder in water

FIG. 1 shows the overruns obtained for the sodium caseinate, SMP and HFB II.

These results show that hydrophobin is at least as foamable as sodium caseinate and SMP, with a lower concentration needed to generate a similar overrun.

(b) Sodium Caseinate and HFB in the Presence of Other Ingredients

Sodium caseinate and HFB II were also aerated in the presence of 20% sucrose (Tate and Lyle) and 20% sucrose+ 0.5% guar gum (Willy Benecke, Germany. 78% gum, 14% moisture, 7% protein, 4% acid insoluble residue, 1% fat and 1% ash). In the case of sodium caseinate with sucrose the dry powders were combined and then slowly added to the water at room temperature that was being mixed on a magnetic stirrer. The solution was then heated to 60° C., held for 5 minutes and then cooled to 5° C. When guar gum was present the guar was added to the solution first with half of the sucrose at room temperature. This solution was then heated to 80° C. and held for 5 minutes before being cooled to 60° C. At this point the sodium caseinate was added with the rest of the sucrose. Stirring was continued at the temperature for 30 minutes before cooling to 5° C. In the case of HFB II, it was added separately to a cooled sucrose or sucrose guar solution either as an aliquot or a dry powder. Initial mixing was carried out on a magnetic stirrer followed by 30 seconds in the ultrasonic bath. Table 2 shows the solutions prepared.

These solutions were aerated for 10 minutes as described in section (a) and the overrun obtained by volume in a measuring cylinder. Table 2 shows the overrun obtained for each sample.

TABLE 2

| Sample | Protein concentration (% w/w) | Average overrun % |
|---|---|---|
| 0.1% NA Cas + sucrose | 0.1 | 78.75 |
| 0.1% NA Cas + sucrose + 0.5% guar gum | 0.1 | 70 |
| 0.1% NA Cas + sucrose + 1% guar gum | 0.1 | 55 |
| 0.1% HFB + sucrose | 0.1 | 75 |
| 0.1% HFB + sucrose + 0.5% guar gum | 0.1 | 83 |
| 0.1% HFB + sucrose + 1% guar gum | 0.1 | 96 |

These results show that hydrophobin has similar foamability to sodium caseinate in a more complex system including sugar, and optionally guar.

EXAMPLE 2

Foam Stability

The stability of an HFB II foam was compared to some commonly used dairy proteins: whey, skimmed milk powder and sodium caseinate. After production, foams were poured into a measuring cylinder to assess their stability in terms of foam volume as a function of time. The volume of foam is stated in terms of percentage "overrun", and based on the definition by Arbuckle (ibid).

Overrun %=100×(volume of foam−volume of unaerated solution)/(volume unaerated solution)

The stability of these foams was measured by monitoring samples contained in 250 ml measuring cylinders and recording serum level and foam height over time at room temperature. The liquid in the foams drain over time, leading to two separate and distinct layers: a foam on top, and aqueous solution below. This is because the aqueous phase does not contain a significant amount of, or any, viscosifiers. However, it is the stability of the foam phase that is the point of interest here. For the calculation of overrun, the volume of foam is taken as the entire volume of the system, i.e. both air (foam) phase and liquid phase irrespective of whether they have separated into two distinct layers. The value of overrun therefore gives a quantitative indication of the stability of the foam to typical break down mechanisms such as coalescence (with themselves and the atmosphere) and disproportionation.

Proteins were dispersed in water alone and in the presence of both 20% sucrose and 20% sucrose+1% guar gum. Table 3 shows the samples that were prepared. Whey powder (Avonol 600—30 wt % protein, 3.5 wt % moisture, 2.5 wt % fat, 7 wt % ash and 53 wt % lactose) was obtained from Glanvia, Ireland.

TABLE 3

| Protein source | Protein concentration | Shear time (seconds) |
|---|---|---|
| HFB II | 0.1 | 600 |
| HFB II + 20% sucrose | 0.1 | 600 |
| HFB II + 20% sucrose and 1% guar gum | 0.1 | 600 |
| Sodium caseinate | 2 | 60 |
| Sodium caseinate + 20% sucrose | 2 | 60 |
| Sodium caseinate + 20% sucrose and 1% guar gum | 2 | 60 |
| Skimmed milk powder | 2.86 | 165 |
| Whey powder | 6.67 | 45 |

The dairy protein solutions were prepared using a magnetic stirrer and the protein was sprinkled into the water at room temperature. The solution was then heated to 60° C., held for 5 minutes and then cooled to 5° C. The HFB II solutions were prepared by using a Sonicor ultrasonic bath model SC-42 (Sonicor Instrument Corp). The HFB II was added either as an aliquot or dry powder which was sonicated for between 30 seconds to 1 minute at room temperature until all of the HFB was dispersed and a clear liquid obtained. This solution was also cooled to 5° C. before aeration.

When 20% sucrose and 20% sucrose+0.5% guar were present the preparation was slightly different. In the case of sodium caseinate with sucrose the dry powders were combined and then sprinkled into the water at room temperature which was being mixed on a magnetic stirrer. The solution was then heated to 60° C., held for 5 minutes and then cooled to 5° C. When guar gum was present the guar was added to the solution first with half of the sucrose at room temperature. This solution was then heated to 80° C. and held for 5 minutes before being cooled to 60° C. At this point the sodium caseinate was added with the rest of the sucrose, stirring was continued at the temperature for 30 minutes before cooling to 5° C. In the case of HFB II, it was added separately to a cooled sucrose or sucrose guar solution either as an aliquot or a dry powder. Initial mixing was carried out on a magnetic stirrer followed by 30 seconds in the ultrasonic bath. Foams were produced as described in Example 1, except that different shear terms were used so as to generate in each case about 100% overrun.

The microstructure of the hydrophobin foam was visualised by Low Temperature Scanning Electron Microscopy (LTSEM). The foam sample was first cut at +5° C. and plunged into liquid nitrogen. The sample was left at −80° C. on dry ice prior SEM sample preparation. A sample section was cut carefully because of its very fragile structure. This section, approximately 6 mm×6 mm×10 mm in size, was mounted on a sample holder using a compound: OCT™ on the point of freezing (supplied by Agar Scientific). The sample including the holder is plunged into liquid nitrogen slush and transferred to a low temperature preparation chamber: Oxford Inst. CT1500HF. The chamber is under vacuum, approximately $10^{-4}$-$10^{-5}$ mbar. The sample is kept at a temperature below −110° C. on a cold stage. The sample is fractured inside the chamber using a scalpel blade and coated with gold using argon plasma This process also takes place under vacuum with an applied pressure of $10^{-1}$ millibars and current of 5 milliamps for 30 seconds. The sample is then transferred to a conventional Scanning Electron Microscope (JSM 5600), fitted with an Oxford Instruments cold stage at a temperature of −150° C. The sample is examined and areas of interest captured via digital image acquisition software.

Results—Foam Stability of Foam Created Using Hydrophobin

Figure 2:
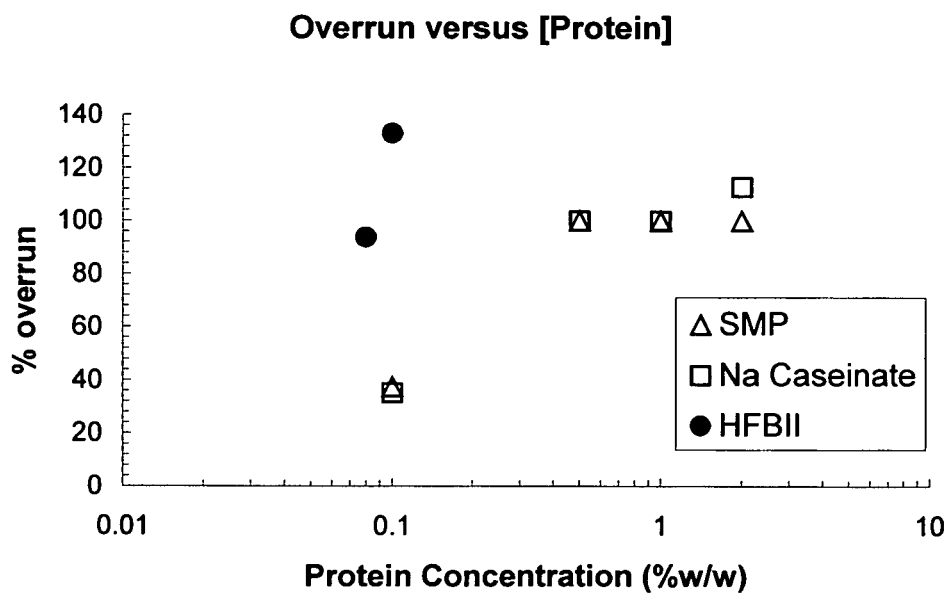
FIG. 2 is a graph showing the foam stability of 0.1 wt % Hydrophobin expressed as overrun. Foam stability is shown for hydrophobin in (1) water (2) a 20 wt % sucrose solution and (3) a solution of 20 wt % sucrose and 1 wt % guar gum.

Foam produced using hydrophobin remained stable over a long time period in all three systems tested (water, +sucrose, +sucrose and guar)—see FIG. 2.

Results—Comparison of Foam Stability of Proteins in Water

Figure 3:
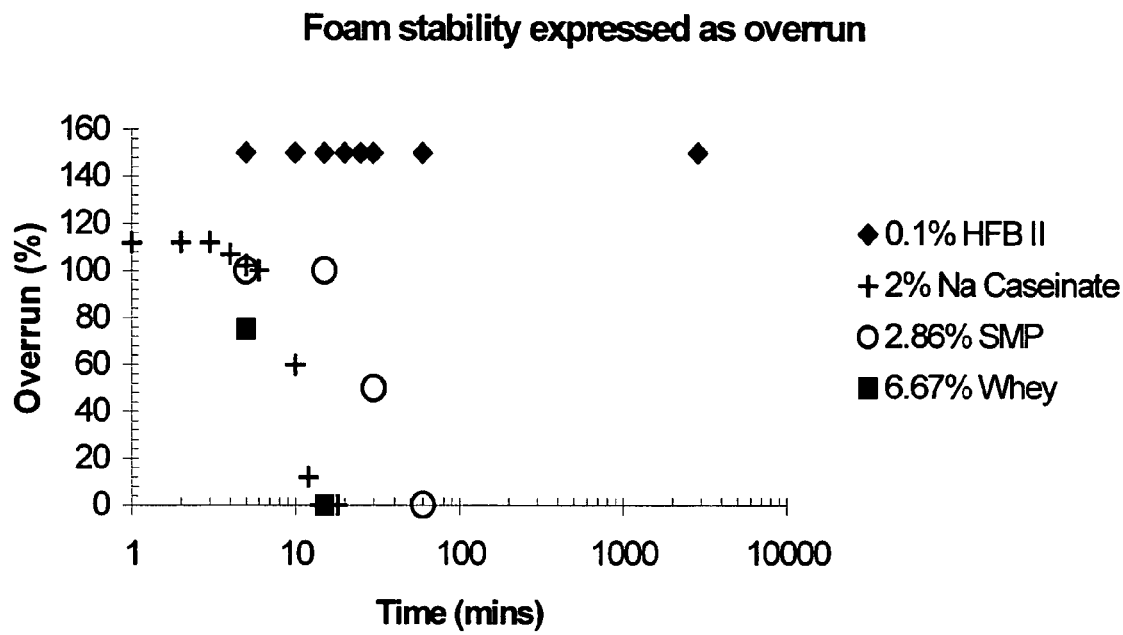
FIG. 3a is a graph comparing the foam stability of 0.1 wt % Hydrophobin in water with aqueous solutions of 2 wt % sodium caseinate, 2.86 wt % skimmed milk powder (equivalent to about 1 wt % protein) and 6.67 wt % whey protein (equivalent to about 2 wt % protein). The foams produced using hydrophobin are considerably more stable than those from conventional proteins.
FIG. 3b is a graph comparing the foam stability of 0.1 wt % Hydrophobin and 2 wt % sodium caseinate in 20 wt % sucrose solution. The foam produced using hydrophobin is considerably more stable than that from 2% sodium caseinate.
FIG. 3c is a graph comparing the foam stability of 0.1 wt % Hydrophobin and 2 wt % sodium caseinate in a solution of 20 wt % sucrose and 1 wt % guar gum. The foam produced using hydrophobin is considerably more stable than that from 2% sodium caseinate.
Figure 3:
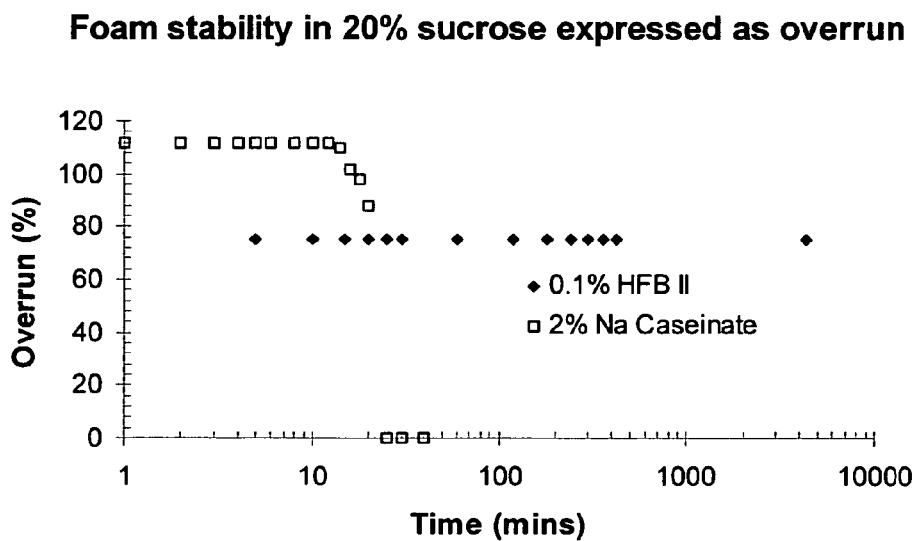
Figure 3:
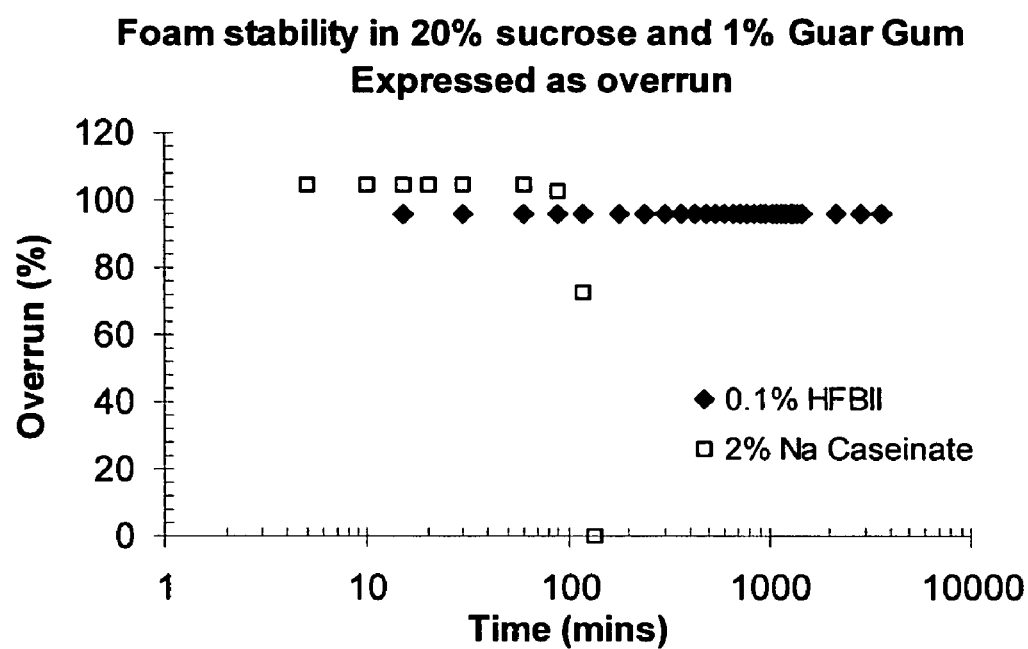

Foams produced from sodium caseinate, skimmed milk powder, and whey protein are all very unstable compared to foam produced using hydrophobin (see FIG. 3A). Further, higher concentrations of skimmed milk powder and whey protein solutions are required to attain an initial overrun of 100% than the concentration needed for hydrophobin.

Results—Comparison of Foam Stability of Hydrophobin and Sodium Caseinate in the Presence of Sucrose/Guar Gum Foams produced using hydrophobin remaining very stable for a considerable period of time (2 weeks) whereas foams produced using sodium caseinate were stable for under 20 mins in the presence of sucrose (FIG. 3b) and under about 2 hours in the presence of the sucrose and guar gum (FIG. 3c).

Therefore, hydrophobin can be used at a low concentration to create significant amounts of foam which remain very stable relative to other commonly used proteins.

Figure 4:
FIG. 4a is a scanning electron micrograph of an aerated food product of the invention after 1 day.
FIG. 4b is a scanning electron micrograph of an aerated food product of the invention after 2 weeks at chill temperature.
Figure 4:
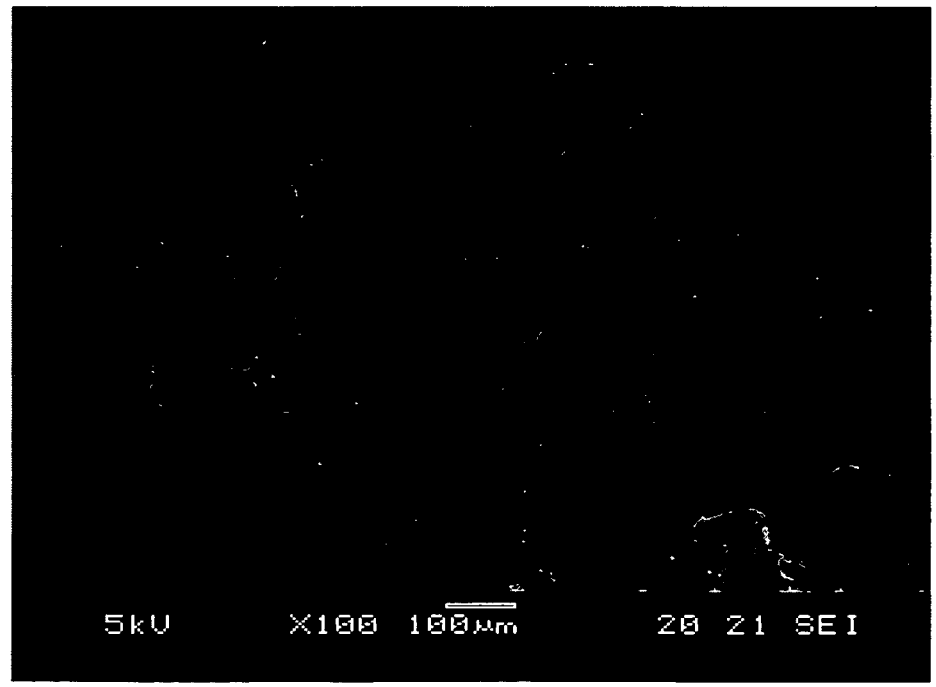

In summary, the data show that the foam that is created with 0.1% HFB II is more stable that those produced by the other proteins tested. All the foams drain over time (which can be reduced by the addition of thickeners), but the bubbles for the hydrophobin foams still remain stable, i.e. the foam system still retains the air (overrun). In addition, we have found that the bubbles present in foams made with hydrophobin remain stable to bubble coarsening at chill temperatures for at least 2 weeks (see FIG. 4 which shows SEM micrographs demonstrating that bubble size is substantially unchanged after 2 weeks). Hence, hydrophobin improves the stability of foams in terms of both foam volume and bubble size. It should be noted that the fractures observed on the surface of the bubbles are believed to be artefacts of the SEM preparation procedure.

EXAMPLE 3

Measurement of Surface Viscosity and Elasticity Using Surface Rheometry

A Camtel CIR-100 interfacial rheometer (Camtel Instruments Limited, Royston, Herts, UK), was used to measure the surface viscosity and elasticity. Such data give an indication of how well an adsorbed molecule will stabilise a foam.

The instrument was used in the normalised resonance mode, using a 13 mm diameter du Nouy ring at the surface of the liquid in a 46 mm diameter sample dish. The ring oscillates on the sample surface, and a high-resolution displacement sensor is used to monitor strain amplitude over the range +/−1°.

Each run was carried out using the same experimental conditions. The runs were time sweeps, with the starting frequency at 3 Hz, and starting amplitude at 10,000 μRadians, and measurements taken at room temperature. The test duration was set at 36,000 seconds, with 240 data points gathered during that time. The physical parameters of interest are G' (storage modulus) and G" (loss modulus) as a function of time, which give an indication of the viscoelasticity of the adsorbed surface layer.

Protein samples were diluted with water to the required concentration. The surface rheology measurements are made relative to pure water, which was measured prior to measurement of the protein solutions.

Figure 5:
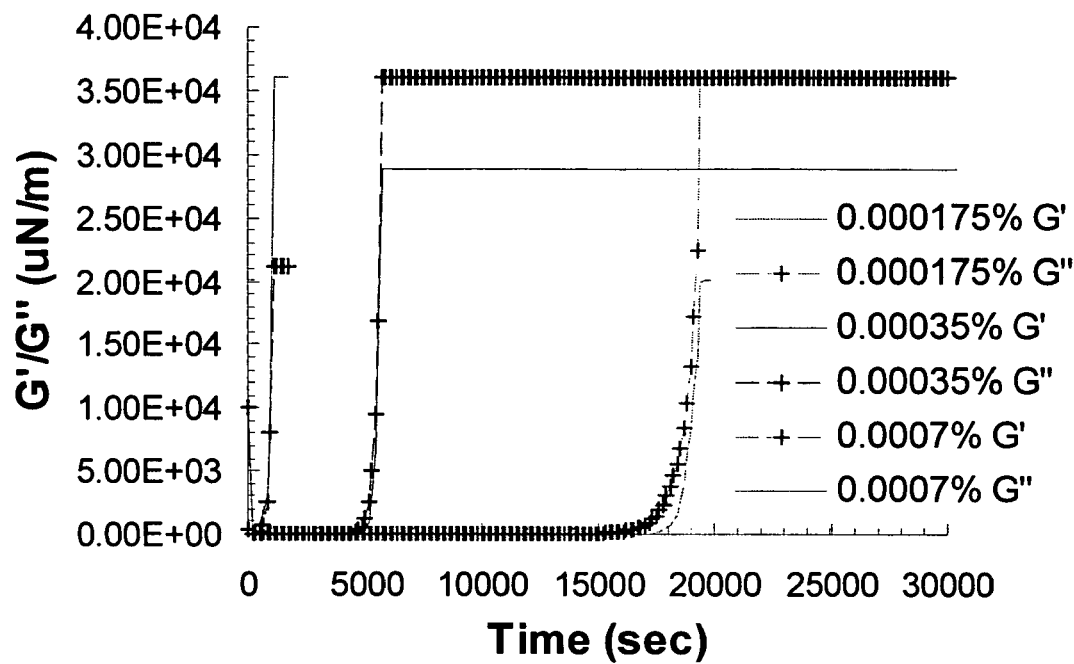
FIG. 5 is a graph showing the interfacial rheological properies (G' and G") of the air/water interface in the presence of hydrophobin. It should be noted that the values increase to such an extent that they go beyond the capability of the instrument.
Figure 6:
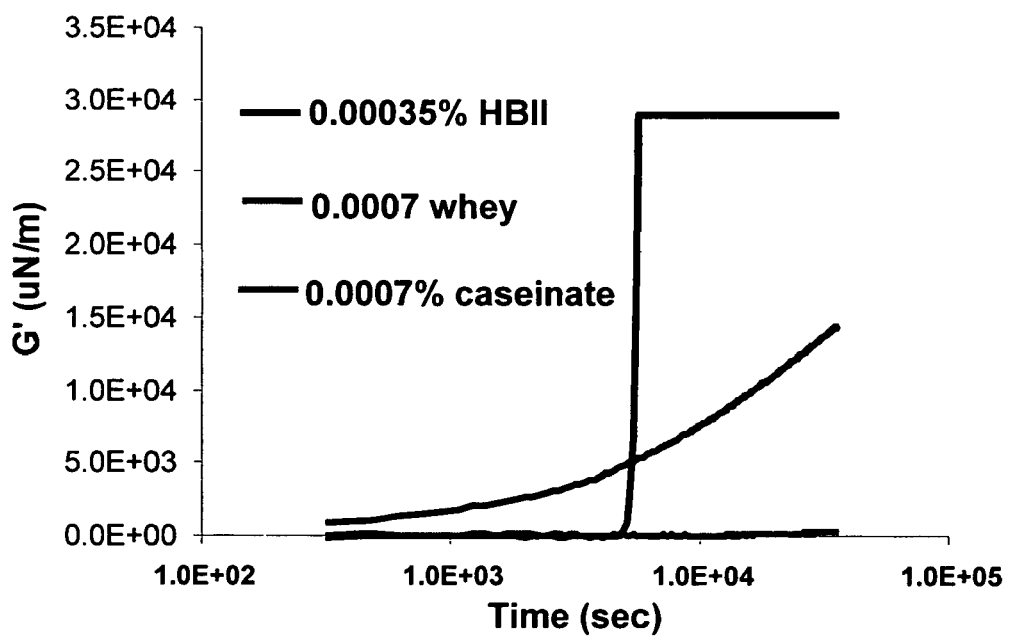
FIG. 6 is a graph showing the interfacial elasticity (G') at the air/water interface of 0.00035 wt % hydrophobin in comparison with 0.0007 wt % sodium caseinate and whey protein. Although the hydrophobin reading goes off scale, the result show that the interfacial elasticity of hydrophobin is significantly higher than those formed by convention proteins.

The surface rheology data is shown in FIGS. 5 and 6. For the hydrophobin protein, G' and G" increase gradually over time, before a rapid increase in both is observed. In the examples shown, the values increase to such an extent that they go beyond the measuring capabilities of the experimental set up. Even at very low concentrations (less than 0.001 wt %), the values for G' and G" reach values far in excess of the proteins used as comparisons: whey protein and sodium caseinate.

It can be concluded from these data that hydrophobin stabilises foams effectively by forming very strong viscoelastic surface layers around the bubbles. These lead to good stability against typical foam destabilising mechanisms such as coalescence and disproportionation. We believe that whey protein and sodium caseinate foams are both less stable that hydrophobin foams, since the surface layers do not exhibit G' and G" values as high as hydrophobin at comparable solution concentrations.

Accordingly, hydrophobins can be used to inhibit bubble coarsening in an aerated food product, for example by inhibiting or reducing disproportionation and/or coalescence. Similarly, hydrophobins can be used to stabilise foams in an aerated food product. Further, given that hydrophobins inhibit bubble coarsening, it will be possible to improve shape retention and rigidity of aerated products.

EXAMPLE 4

Aerated Frozen Products

Aerated frozen products were prepared using 3 types of protein:
A: Sodium Caseinate (Na Cas)
B: Skimmed Milk Powder (SMP)
C: Hydrophobin (HFBII) from *Trichoderma Reesei*

Microstructural and physical properties of the products were compared, both before and after temperature abuse regimes.

Materials

Details of the materials used are summarised in Table 4 and the formulations from which each of the aerated frozen products was prepared are shown in Table 5.

TABLE 4

Materials used

| Ingredient | Composition | Supplier |
|---|---|---|
| Sodium caseinate | 88-90% protein, 1.5% fat, 6% moisture | DMV International, The Netherlands. |
| Skimmed milk powder | 33-36% protein, 0.8% fat, 3.7% moisture | United Milk, UK. |
| Hydrophobin type II (HFB II) | Purified from *Trichoderma reesei* essentially as described in WO00/58342 | VTT Biotechnology, Finland. |

TABLE 4-continued

Materials used

| Ingredient | Composition | Supplier |
|---|---|---|
| | and Linder et al, 2001, Biomacromolecules 2: 511-517). | |
| Refined Coconut Oil | | Van den Bergh Foods, Limited |
| Sucrose | | Tate and Lyle, UK. |

TABLE 5

Formulations used

| Ingredient | Mix A | Mix B | Mix C |
|---|---|---|---|
| | Concentration/wt % | | |
| Sodium caseinate | 2.0 | — | — |
| Skimmed milk powder | — | 11.42 | — |
| HFB II | — | — | 0.2 |
| Coconut Oil | 5.0 | 5.0 | 5.0 |
| Sucrose | 25.0 | 20.0 | 25.0 |
| Water | 68.0 | 63.58 | 69.8 |

Preparation of the Aerated Frozen Products

Mix (Emulsion) Preparation

All mixes were made in 100 g batches. For Mixes A and B (containing sodium caseinate and skimmed milk powder, respectively), the protein was combined with the sucrose and dispersed into cold water using a magnetic stirrer. The solution was then heat to 60° C. with stirring and held for 5 minutes before being cooled to 40° C. Molten coconut fat was then added and the aqueous mix immediately sonicated (Branson Sonifer with 6.4 mm tapered tip) for 3 minutes at 70% amplitude with the tip well immersed in the solution. The emulsion was then cooled rapidly in a −10° C. water bath until the solution temperature was 5° C., to crystallise the fat droplets. The mixes were stored at 5° C. until further use.

For Mix C (containing HFB II), the sucrose was first dispersed into cold water with stirring. Then, half of the required concentration of HFB II was added to this as an aliquot. The solution was then gently sonicated in a sonic bath for 30 seconds to fully disperse the HFB II. This solution was then stirred on a magnetic stirrer and heated to 40° C. Before the molten fat was added the solution was again sonicated in a sonic bath for 30 seconds. The molten fat was then added and the mix was emulsified and cooled as described for Mixes A and B. A further aliquot of HFB II was then added to this cold solution to bring the HFB II concentration up to 0.2%. The first 0.1% of HFB II was for emulsifying and stabilising the fat. The second addition of HFB II would provide adequate excess HFBII to provide good aeration and foam stability.

Particle size analysis on the chill emulsions was performed using a Malvern Mastersizer 2000.

Analysis of Emulsions

Following this methodology, we were able to make emulsions with small fat droplets. A summary of oil droplet sizes measured are shown in Table 6.

TABLE 6

Emulsion particle size as measured using the Malvern Mastersizer 2000

| Mix | Fat droplet diameter D(3,2)/μm |
|---|---|
| A (Na Cas) | 0.4 |
| B (SMP) | 0.25 |
| C (HFB II) | 1.88 |

Figure 7:
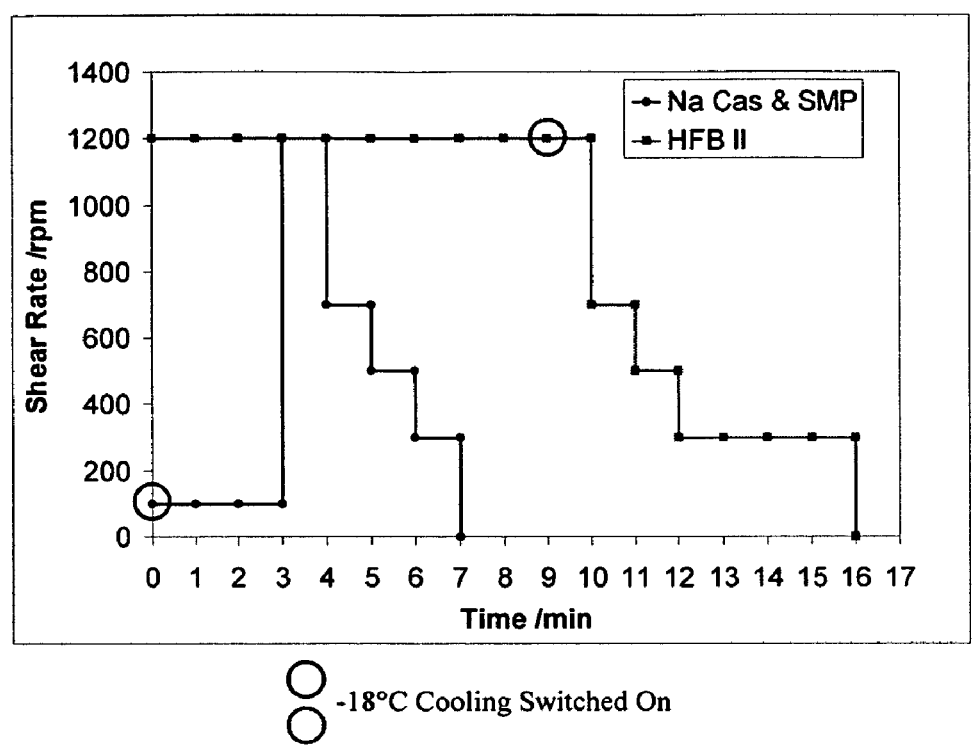
FIG. 7 is a diagram showing shear regimes for the aerated frozen products.

Shear Freezing Process 80 ml of mix was sheared and frozen simultaneously in the vessel described in Example 1. In essence an aerated and frozen prototype is produced as follows: The mix inside the enclosed container is mixed with an impeller at a high shear rate in order to incorporate air. Simultaneously, the coolant flows around the container jacket to cool and freeze the mix. The impeller also scrapes the inside wall, removing the ice that forms there and incorporating this into the rest of the mix. High shear is used to initially aerated the mix, and then the shear rate is slowed in order to allow better cooling and freezing. The shear regimes used for each mix are graphically presented in FIG. 7.

For the freezing and aeration step with Mixes A and B (containing sodium caseinate and skimmed milk powder, respectively) the coolant (set at −18° C.) was set to circulate from Time=0 minutes. The relatively slow stirring at the start for Mixes A and B allowed for cooling of the mix and generation of some viscosity (via ice formation and incorporation) prior to aeration using higher shear. A short time at high speed incorporated the air and then the speed was stepped down to allow the samples to reach at least −5° C.

For Mix C (containing HFB II) the pot was chilled to about 5° C. and the sample added and the high shear for aerated started. The coolant (set at −18° C.) was not switched to circulate on until 9 minutes due to the increased time required to generate 100% overrun. Once the coolant was switched on to circulate (at 9 minutes), the same shear-cooling pattern as previous (for A and B) was adopted.

At the end of the process, overrun was measured and samples (approximately 15 g) were placed into small pots. Each product was cooled further for 10 minutes in a freezer set at −80° C. before being stored at −20° C.

Analysis of Aerated Frozen Products

All aerated frozen products were stored under two temperature regimes:
(a) −20° C. Subsequent analysis was made within one week of production and we deem this as "fresh" product.
(b) Temperature abused samples were subject to storage at −10° C. for 1 or 2 weeks, and then subsequently stored at −20° C. before analysis.

TABLE 8

Process details and product overrun for products prepared from Mixes A, B, and C.

| Sample | Shear time at 1200 rpm min | Overrun % | End product temperature ° C. |
|---|---|---|---|
| A (Na Cas) | 1 | 103 | −5.3 |
| B (SMP) | 1 | 98 | −8 |
| B (SMP) | 1 | 94 | −5.6 |
| C (HFB II) | 10 | 75 | −5 |

Final products were analysed as follows:
Overrun of freshly made product
SEM analysis on fresh and temperature abused product
Melting behaviour on fresh and temperature abused product Overrun The overrun for each of the products is summarised in Table 8. All of the mixes were aeratable and incorporated significant amounts of air.

Microstructural Stability: Methodology
Scanning Electron Microscopy (SEM)

The microstructure of each products was visualised using Low Temperature Scanning Electron Microscopy (LTSEM). The sample was cooled to −80° C. on dry ice and a sample section cut. This section, approximately 5 mm×5 mm×10 mm in size, was mounted on a sample holder using a Tissue Tek: OCT™ compound (PVA 11%, Carbowax 5% and 85% non-reactive components). The sample including the holder was plunged into liquid nitrogen slush and transferred to a low temperature preparation chamber: Oxford Instrument CT1500HF. The chamber is under vacuum, approximately $10^{-4}$ bar, and the sample is warmed up to −90° C. Ice is slowly etched to reveal surface details not caused by the ice itself, so water is removed at this temperature under constant vacuum for 60 to 90 seconds. Once etched, the sample is cooled to −110° C. ending up the sublimation, and coated with gold using argon plasma. This process also takes place under vacuum with an applied pressure of $10^{-1}$ millibars and current of 6 milliamps for 45 seconds. The sample is then transferred to a conventional Scanning Electron Microscope (JSM 5600), fitted with an Oxford Instruments cold stage at a temperature of −160° C. The sample is examined and areas of interest captured via digital image acquisition software.

Microstructural Analysis: Results

Figure 8:
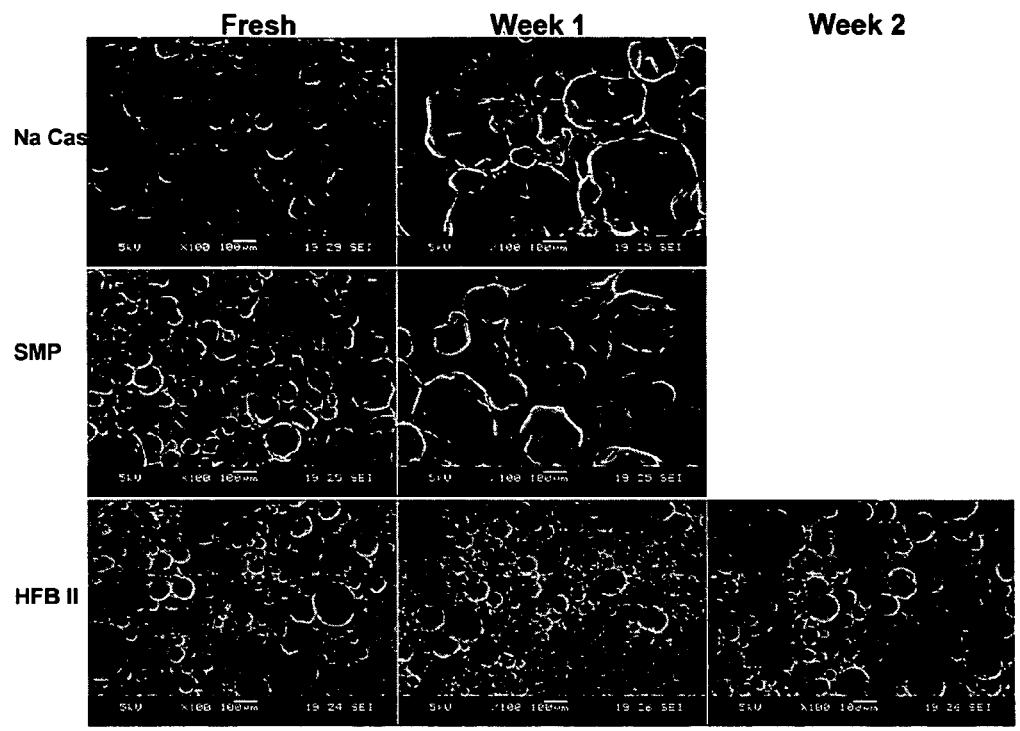
FIG. 8 is a scanning electron micrograph of product microstructures—fresh and after abuse (Magnification ×100)
Figure 9:
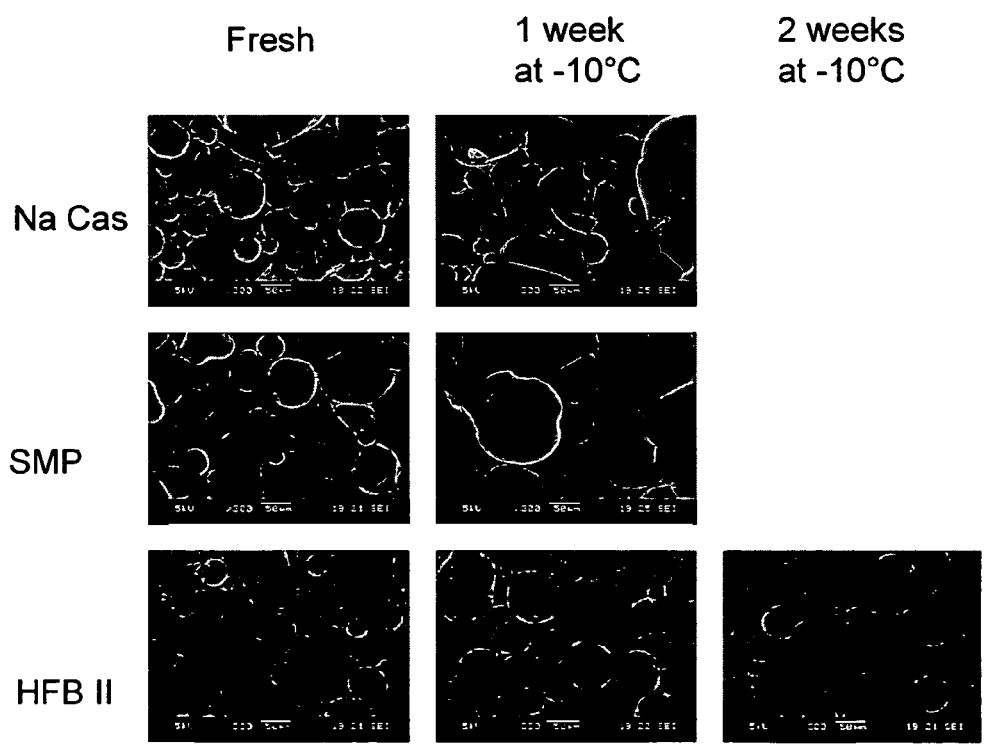
FIG. 9 is a scanning electron micrograph of product microstructures—fresh and after abuse (Magnification ×300)

Scanning Electron Microscopy (SEM) was used to examine the microstructure of the fresh and temperature abused frozen products. Representative images can be seen in FIGS. 8 and 9 at different magnifications.

After temperature abuse the SEM images clearly show that the HFB II containing product (from Mix C) has retained its original microstructure, i.e. there is little apparent air bubble coarsening. This is the case after 1 and 2 weeks storage at −10° C. However, the prototypes containing Na Cas and SMP (from Mix A and B, respectively) show very severe coarsening of the gas structure under temperature abused at −10° C. after just one week.

Overall, it is clear that the frozen product made containing HFBII shows much greater stability to temperature abuse than the frozen product made using sodium caseinate or skim milk powder. HFBII has an influence on air bubble stability.

Melting Behaviour: Methodology

Samples of frozen product were placed on a metal grid at room temperature (20° C.). Differences in the way the products melted, notably shape retention and foam stability, were observed as a function of time.

Melting Behaviour: Results

These microstructural differences (stable foam and stable ice) had some impact on the melting behavior of the frozen product. The aerated frozen sample made from Mix C (containing HFBII) retained its shape better on melting, compared to the product made with sodium caseinate or skimmed milk powder (i.e. Mixes A and B, respectively).

As the ice melted and formed water, it flowed through the melting grid. However, for the product with HFBII, much of the foam also remained on the grid with some stable drops of foam observed beneath—neither of these characteristics was observed with the conventional proteins (sodium caseinate and skimmed milk powder). This illustrates the differences in the foam stability between each of the proteins used.

Textural Differences between Products A, B, and C

Clear differences in texture between the three samples could also be observed after one week storage at −10° C. (i.e. temperature abused samples). On handling the product made using sodium caseinate (A) and skimmed milk powder (B), these were noticed to have a very soft and very flaky texture, which was difficult to cleanly remove from the silicon paper used to line the sample pot. The product made using HFBII (C), on the other hand, was very firm and released from the silicon paper lining the sample pot very cleanly. In other words, the product prepared using HFBII shows much greater stability to temperature abuse on both a microscopic and macroscopic scale than product prepared using sodium caseinate or skim milk powder.

The various features and embodiments of the present invention, referred to in individual sections above apply, as appropriate, to other sections, *mutatis mutandis*. Consequently features specified in one section may be combined with features specified in other sections, as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. An aerated food product with foam comprising a biopolymer and at least about 0.01 weight % up to 0.2 weight % of an isolated Class II hydrophobin, wherein the amount of the isolated Class II hydrophobin within said range is effective to maintain aerated foam stability in terms of foam volume in the product for at least two weeks when the aerated food product with foam is maintained at 5° C.

2. The aerated food product of claim 1 which is an aerated frozen food product.

3. The aerated food product of claim 1 which is an aerated chilled food product.

4. The aerated food product of claim 1 which is an aerated confectionery product.

5. A food product which is later aerated to form a food product foam comprising a biopolymer and at least about 0.01 weight % up to 0.2 weight % of an isolated Class II hydrophobin, wherein amount of the upon aeration of the food product to form a food product foam, the amount of the isolated Class II hydrophobin within said range is effective to maintain foam stability in terms of foam volume in the aerated food product for at least two weeks when the food product foam is maintained at 5° C.

* * * * *